United States Patent
Daitoku et al.

(10) Patent No.: US 9,903,765 B2
(45) Date of Patent: Feb. 27, 2018

(54) APPARATUS FOR DETECTING TEMPERATURE OF SEMICONDUCTOR ELEMENTS FOR POWER CONVERSION

(71) Applicant: DENSO CORPORATION, Kariya, Aichi-pref. (JP)

(72) Inventors: Osamu Daitoku, Kariya (JP); Hiroshi Fujita, Kuwana (JP)

(73) Assignee: DENSO CORPORATION, Kariya (JP)

( * ) Notice: Subject to any disclaimer, the term of this patent is extended or adjusted under 35 U.S.C. 154(b) by 675 days.

(21) Appl. No.: 14/565,733

(22) Filed: Dec. 10, 2014

(65) Prior Publication Data

US 2015/0204730 A1    Jul. 23, 2015

(30) Foreign Application Priority Data

Dec. 11, 2013  (JP) ................................ 2013-255769
Oct. 29, 2014  (JP) ................................ 2014-220603

(51) Int. Cl.
*G01K 7/00*   (2006.01)
*G01K 1/00*   (2006.01)
(Continued)

(52) U.S. Cl.
CPC .............. *G01K 7/01* (2013.01); *G01K 1/026* (2013.01); *H02M 1/32* (2013.01); *H02P 29/68* (2016.02);
(Continued)

(58) Field of Classification Search
USPC .................... 374/178, 152, 166, 110, 112
See application file for complete search history.

(56) References Cited

U.S. PATENT DOCUMENTS

2005/0197799 A1* 9/2005 Kamezawa .............. G01K 7/22
                                              702/130
2007/0073510 A1* 3/2007 Kerkman ............... G01K 7/425
                                              702/130
(Continued)

FOREIGN PATENT DOCUMENTS

JP      63-031468     2/1988
JP      2008-206345   9/2008
(Continued)

OTHER PUBLICATIONS

Office Action (2 pages) dated Dec. 8, 2015, issued in corresponding Japanese Application No. 2014-220603 and English translation (2 pages).

*Primary Examiner* — Mirellys Jagan
(74) *Attorney, Agent, or Firm* — Nixon & Vanderhye PC

(57) ABSTRACT

An apparatus for detecting temperatures of power-conversion semiconductor elements, which is applicable to a system including a plurality of power-conversion semiconductor elements and a plurality of temperature signal outputs for outputting temperature signals correlated to temperatures of the respective semiconductor elements. In the apparatus, the temperature signal outputted from at least one of the temperature signal outputs is input directly to a microcomputer without passing through at least one input-output interface. The temperature signals outputted from the other two or more temperature signal outputs are input to a plurality of input ports of the at least one input-output interface sequentially connected to an output of the interface. The microcomputer detects the temperatures of the respective semiconductor elements based on the temperature signals received from the output port of the at least one input-output interface and the temperature signal received directly from the at least one of the temperature signal outputs.

13 Claims, 13 Drawing Sheets

(51) Int. Cl.
  *G01K 3/00* (2006.01)
  *G01K 7/01* (2006.01)
  *G01K 1/02* (2006.01)
  *H02M 1/32* (2007.01)
  *H02P 29/68* (2016.01)
  *H02M 7/48* (2007.01)
(52) U.S. Cl.
  CPC ........... *G01K 2205/00* (2013.01); *H02M 7/48* (2013.01); *H02M 2001/327* (2013.01)

(56) References Cited

U.S. PATENT DOCUMENTS

| | | | | |
|---|---|---|---|---|
| 2007/0097718 | A1* | 5/2007 | Nahar | G01K 7/425 |
| | | | | 363/65 |
| 2008/0262750 | A1* | 10/2008 | Ibori | H02M 5/451 |
| | | | | 702/34 |
| 2011/0002358 | A1* | 1/2011 | Sato | G01K 1/026 |
| | | | | 374/163 |
| 2013/0147407 | A1* | 6/2013 | Kawamura | H03K 17/0828 |
| | | | | 318/400.21 |
| 2013/0322487 | A1* | 12/2013 | Watanabe | G01K 7/02 |
| | | | | 374/4 |
| 2014/0212289 | A1* | 7/2014 | Thogersen | G01K 7/01 |
| | | | | 416/146 R |
| 2015/0001965 | A1* | 1/2015 | Angeli | G01R 19/00 |
| | | | | 307/117 |
| 2015/0198485 | A1* | 7/2015 | Kim | G01K 7/01 |
| | | | | 374/178 |

FOREIGN PATENT DOCUMENTS

| | | |
|---|---|---|
| JP | 2009-240024 | 10/2009 |
| JP | 2011-055612 | 3/2011 |
| JP | 2011-078194 | 4/2011 |
| JP | 2011-167038 | 8/2011 |

\* cited by examiner

APPARATUS FOR DETECTING TEMPERATURE OF SEMICONDUCTOR ELEMENTS FOR POWER CONVERSION

CROSS-REFERENCE TO RELATED APPLICATION

This application claims priority to JP Patent Application Nos. 2013-255769 filed Dec. 11, 2013 and 2014-220603 filed Oct. 29, 2014, the entire contents of each of which are hereby incorporated by reference.

BACKGROUND

Technical Field

The present invention relates to an apparatus for detecting temperatures of semiconductor elements for power conversion.

Related Art

Conventionally, a known power converter, as disclosed in Japanese Patent Application Laid-Open Publication No. 2008-206345, includes a plurality of switching elements, such as insulated gate bipolar transistors (IGBTs), is configured such that temperatures of some of the plurality of switching elements can be detected by temperature sensing elements. More specifically, in such a power converter, a prespecified one of the switching elements is assumed to be hottest among the switching elements during use. In such a power converter, the plurality of switching elements are de-energized, when the detected temperature of the prespecified switching element has reached a predetermined threshold temperature. Such a power converter is thus intended to protect the switching elements from overheating.

Such a configuration that temperatures of some of the plurality of switching elements are detected may give rise to the following disadvantages.

Even though the prespecified one of the switching elements is assumed at the time of designing to be hottest during use, another switching element may actually be hottest among the switching elements during use due to aging or the like of the power converter. There is a disadvantage that, if the power converter is not configured to detect a temperature of such another switching element, all the switching elements couldn't be reliably protected from overheating based on the detected temperature of the prespecified one of the switching elements assumed at the time of designing to be hottest during use.

In addition, the temperatures of the respective switching elements may vary during flowing of collector currents through the respective switching elements due to their aging or individual difference. Therefore, when the power converter is configured to detect temperatures of some of the switching elements, the threshold temperature that is used to protect the switching elements from overheating needs to be set lower than an upper limit by a large margin for safety, below which upper limit the reliability of the switching elements can be retained. However, in such a configuration, there is a disadvantage that the overheat protecting process may be performed even though the actual temperatures of the switching elements have not yet reached the upper-limit temperature, and a temperature range where use of the switching elements is restricted may enlarge.

Power-conversion semiconductor elements, whether switching elements or not, may suffer from such disadvantages.

In consideration of the foregoing, exemplary embodiments of the present invention are directed to providing an apparatus for detecting temperatures of a plurality of semiconductor elements for power conversion, capable of preventing the semiconductor elements from overheating and preventing enlargement of a temperature range where use is restricted.

SUMMARY

In accordance with an exemplary embodiment of the present invention, there is provided an apparatus for detecting temperatures of power-conversion semiconductor elements, the apparatus being applicable to a system including a plurality of power-conversion semiconductor elements that produce heat when energized, a plurality of temperature signal outputs associated with the respective power-conversion semiconductor elements, the temperature signal outputs being configured to output temperature signals correlated to temperatures of the respective power-conversion semiconductor elements, the apparatus including: a microcomputer configured to detect the temperatures of the respective power-conversion semiconductor elements based on the temperature signals outputted from the respective temperature signal outputs, at least one input-output interface having a plurality of input ports and an output port selectively connected to one of the plurality of input ports, wherein the temperature signal outputted from at least one of the plurality of temperature signal outputs is input directly to the microcomputer without passing through the at least one input-output interface, and the temperature signals outputted from the other two or more temperature signal outputs are input to the respective input ports of the at least one input-output interface, the microcomputer is configured to detect the temperatures of the respective power-conversion semiconductor elements based on the temperature signals received from the output port of the at least one input-output interface and the temperature signal received directly from the at least one of the plurality of temperature signal outputs.

In the above embodiment, the temperature signal outputs are provided for the respective power-conversion semiconductor elements. This allows the microcomputer to detect the temperature of each of the plurality of power-conversion semiconductor elements. Hence, even though a prespecified one of the switching elements is initially assumed to be hottest during use of the system, another switching element may actually be hottest among the switching elements during use due to aging or the like of the system. Even in such a case, the microcomputer is able to determine which semiconductor element is hottest among the plurality of switching elements. It is thus possible to prevent the semiconductor elements from overheating and prevent enlargement of a temperature range where use of the system is restricted.

In addition, in the above embodiment, the temperature signal outputted from at least one of the plurality of temperature signal outputs is input directly to the microcomputer without passing through the at least one input-output interface. Therefore, even if the at least one input-output interface fails, paths can be ensured between the microcomputer and the temperature signal outputs other than the at least one of the temperature signal outputs that is not connected to the at least one input-output interface. Even if the at least one input-output interface fails, this can achieve fail-safe, such as power saving, and can thus prevent substantial degradation of the reliability of the system.

In addition, in the above embodiment, signal transferring paths between the microcomputer and the other two or more temperature signal outputs can be established by using the input-output interface. The input-output interface is configured such that the number of output ports is less than the number of input ports. Therefore, the number of input ports of the microcomputer required to detect the temperatures of the respective power-conversion semiconductor elements can be reduced less than the total number of power-conversion semiconductor elements. This allows the apparatus to be downsized and costs of the apparatus to be reduced.

In another embodiment, the apparatus is applied to a system including a plurality of power-conversion semiconductor elements that produce heat when energized, and a plurality of temperature signal outputs associated with the respective power-conversion semiconductor elements, where the temperature signal outputs are configured to output temperature signals correlated to temperatures of the respective power-conversion semiconductor elements. The apparatus includes a microcomputer having a plurality of input ports for receiving the temperature signals from the respective temperature signal outputs, each for a respective one of the temperature signals, and is configured to detect the temperatures of the respective power-conversion semiconductor elements based on the temperature signals received at the respective input ports.

In the above other embodiment, the temperature signal outputs are provided for the plurality of power-conversion semiconductor elements, one for each power-conversion semiconductor element. The microcomputer has the plurality of input ports for respectively receiving the temperature signals from the respective temperature signal outputs. That is, in the microcomputer is configured such that the number of the temperature signal outputs is equal to the number of the input ports. Thus, the microcomputer is able to detect the temperatures of the respective whole power-conversion semiconductor elements. Even though a prespecified one of the switching elements is initially assumed to be hottest during use of the system, another switching element may actually be hottest among the switching elements during use due to aging or the like of the system. Even in such a case, the microcomputer is able to determine which semiconductor element is hottest among the plurality of switching elements. It is thus possible to prevent the semiconductor elements from overheating and prevent enlargement of a temperature range where use of the system is restricted.

DESCRIPTION OF SPECIFIC EMBODIMENTS

Embodiments of the present invention now will be described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

First Embodiment

There will now be explained a temperature detection apparatus applied to a vehicle-mounted power converter (a three-phase inverter) in accordance with a first embodiment of the present invention with reference to the accompanying drawings.

The three-phase inverter of the first embodiment will be explained with reference to FIGS. 1 and 2.

Figure 1:
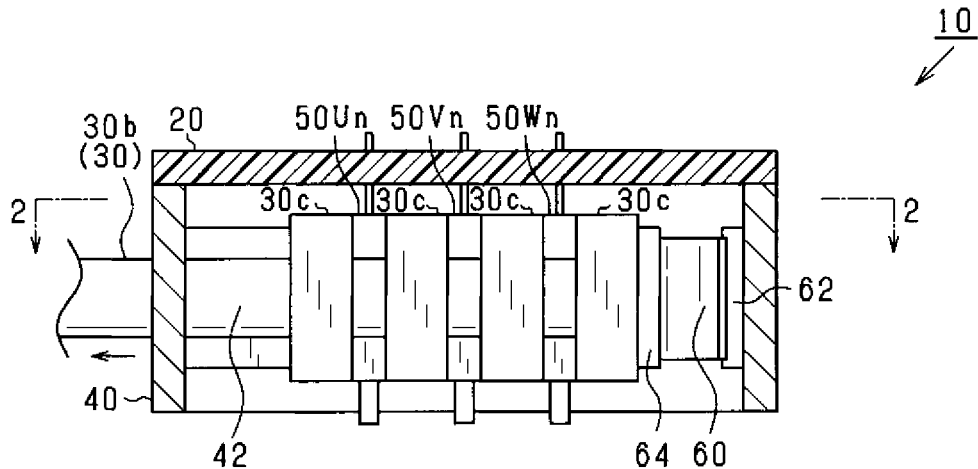
FIG. 1 is a cross-sectional view of a three-phase inverter in accordance with a first embodiment of the present invention.
Figure 2:
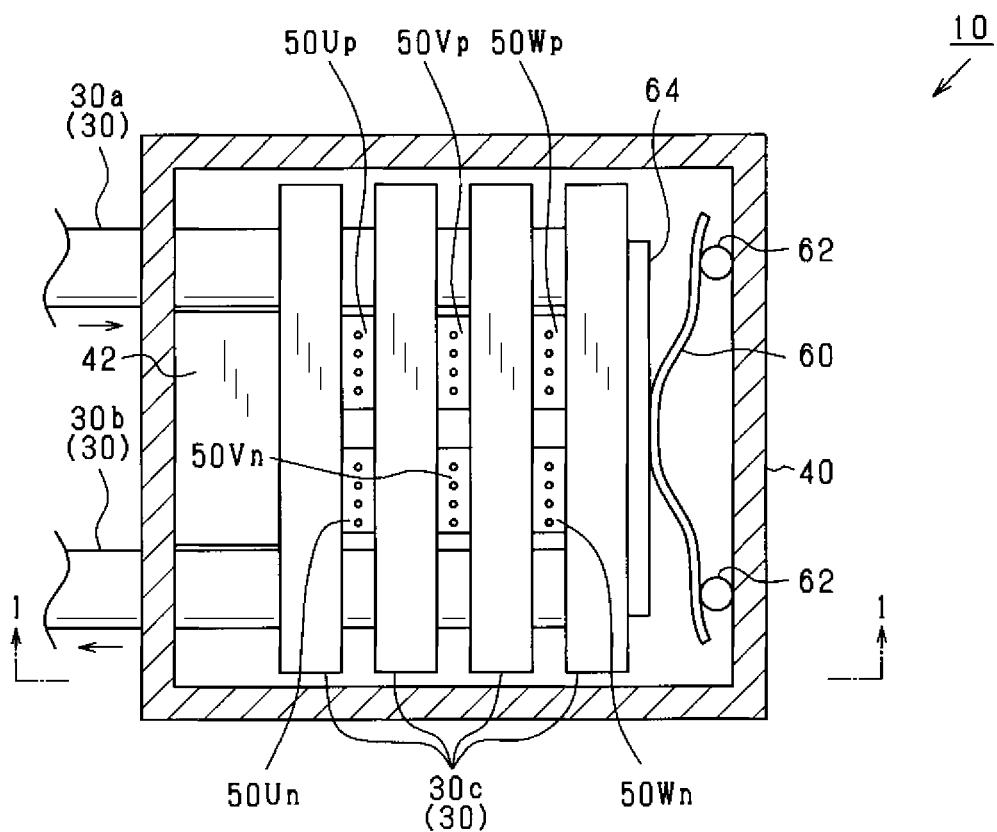
FIG. 2 is a cross-sectional view of the three-phase inverter taken along line 2-2 of FIG. 1.

As shown in FIGS. 1 and 2, the three-phase inverter 10 includes a circuit board 20, a cooler 30, a frame 40, U-, V-, W-phase upper-arm semiconductor modules 50Up, 50Vp, 50Wp, and U-, V-, W-phase lower-arm semiconductor modules 50Un, 50Vn, 50Wn.

Each semiconductor module $50\alpha\beta$ ($\alpha$=U, V, W: $\beta$=p, n) is a member, into which a switching element, a freewheel diode electrically connected in anti-parallel with the switching element, and a temperature-sensitive diode for detecting a temperature of the switching element are modularized. In the present embodiment, an insulated gate bipolar transistors (IGBT) is used as the switching element. The switching element and the temperature-sensitive diode are formed on the same chip.

Each semiconductor module $50\alpha\beta$ has a body including therein the switching element, the freewheel diode, and the temperature-sensitive diode. The body is a flattened cuboid. A plurality of control terminals protrude from and perpendicularly to one of surfaces of the body. The plurality of control terminals include a gate terminal and an emitter terminal (referred to as a Kelvin emitter terminal) of the switching element.

Each semiconductor module $50\alpha\beta$ is secured to the circuit board 20 via the control terminals. More specifically, each semiconductor module $50\alpha\beta$ is secured to the circuit board 20 by soldering the control terminals to the circuit board 20.

The frame 40 surrounds the six semiconductor modules 50αβ. The circuit board 20 is secured on top of the frame 40. For example, the frame 40 is stiff enough to compressively hold the cooler 30 and the respective semiconductor modules 50αβ, and made of a material capable of blocking switching noise (e.g., metal or conductive resin).

The circuit board 20 is rectangular in shape as viewed from a perpendicular direction to a front surface of the circuit board 20. The circuit board 20 is functional to turn on and off the switching elements of the respective semiconductor modules 50αβ. This function of the circuit board 20 is realized by an electronic component, such as a microcomputer or the like, mounted on the circuit board 20.

The cooler 30 includes an inlet line 30a, an outlet line 30b, and a plurality of (e.g., four) cooling members 30c, and is secured to the frame 40. The inlet line 30a is a member for introducing a cooling fluid for cooling the respective semiconductor modules 50αβ into the three-phase inverter 10. The outlet line 30b is a member for outputting the cooling fluid from the three-phase inverter 10. Each of the cooling members 30c connects the inlet line 30a and the outlet line 30b to direct the cooling fluid from the inlet line 30a to the outlet line 30b.

The cooling members 30c are each a flattened cuboid in shape and arranged in line. For each pair of upper-arm semiconductor module 50αp and lower-arm semiconductor module 50αn (α=U, V, W), the upper-arm semiconductor module 50αp and the lower-arm semiconductor module 50αn of the same phase are arranged in line between a pair of adjacent cooling members 30c. More specifically, the semiconductor modules 50αp, 50αn of the same phase are arranged in line along the longitudinal direction of the cooling members 30c (a direction from the inlet line 30a to the outlet line). The upper-arm semiconductor module 50αp is arranged upstream of the lower-arm semiconductor module 50αn along a flow path of the cooling fluid including the inlet line 30a, the outlet line 30b, and the cooling members 30c. The pairs of upper-arm semiconductor module 50αp and lower-arm semiconductor module 50αn (α=U, V, W) and the plurality of cooling members 30c are stacked alternately, thereby forming a stack.

A wall member 42 is provided on an inner circumferential wall of the frame 40. On a side of the wall member 42 facing the stack is formed a wall surface. In the present embodiment, the wall member 42 is made of the same material as the frame 40.

A pressing member 60 is provided on a portion of the inner circumferential wall of the frame 40 facing the wall member 42 with mounting pins 62 between the pressing member 60 and the portion of the inner circumferential wall. The pressing member 60 is a member for pushing the stack of the cooling members 30c and the semiconductor modules 50αβ toward the wall member 42. More specifically, one of opposite sides of the stack is pushed by the pressing member 60 toward the wall member 42 with the other of opposite sides of the stack (a side of the leftmost cooling member 30c facing the wall member 42) kept in contact with the wall surface of the wall member 42. This can enhance the fit between the cooling members 30c and their respective adjacent semiconductor modules, thereby enhancing the heat dissipation of the semiconductor modules. In the present embodiment, a plate spring is used as the pressing member 60. In the present embodiment, the stack is pushed by the pressing member 60 via the plate member 64. An arc-like portion of the pressing member 60 is pressed directly onto the plate member 64, thus indirectly onto the stack, which can prevent the cooling members 30c from being considerably deformed.

In the cooler 30 configured as above, when the cooling fluid is introduced form the inlet line 30a, the cooling fluid flows through the respective cooling members 30c. The cooling fluid is output from the outlet line 30b after flowing through the respective cooling members 30c, thereby cooling the respective semiconductor modules 50αβ.

In the present embodiment, it is assumed that there is the hottest one of the six semiconductor modules 50αβ (α=U, V, W: β=p, n) during use (that is, while the switching elements Sαβ of the three-phase inverter 10 are turned on and off). In the present embodiment, it is assumed that the hottest one of the six semiconductor modules is the V-phase lower-arm semiconductor module 50Vn that is on the downstream side of the cooling fluid and between the middle pair of the adjacent cooling members 30c. In addition, it is further assumed that the second hottest one of the six semiconductor modules is the W-phase lower-arm semiconductor module 50Wp.

That is, during use of the three-phase inverter 10, a temperature of the cooling fluid on the downstream side of the flow path of the cooling fluid is greater than a temperature of the cooling fluid on the upstream side of the flow path of the cooling fluid. Therefore, during use of the three-phase inverter 10, a temperature of the semiconductor module 50αn on the downstream side of the flow path is greater than a temperature of the semiconductor module 50αp on the upstream side of the flow path. Each cooling member 30c other than the cooling members 30c adjacent the V-phase semiconductor modules 50Vβ (50Vp, 50Vn) are in contact with either the wall member 42 or the plate member 64. Therefore, an amount of heat dissipated from each cooling member 30c (along the heat dissipation path) other than the cooling members 30c adjacent the V-phase semiconductor modules 50Vβ is greater than an amount of heat dissipated from each cooling member 30c (along the heat dissipation path) adjacent the V-phase semiconductor modules 50Vβ. Therefore, the center V-phase semiconductor modules 50Vβ are prone to be hotter. Besides this reason, since collector currents of the switching elements of the respective semiconductor module 50αβ have the substantially same average value, the V-phase lower-arm semiconductor module 50Vn is hottest, and the W-phase lower-arm semiconductor module 50Wp is second hottest.

An overall configuration of a motor control system of the present embodiment will now be explained with reference to FIG. 3.

Figure 3:
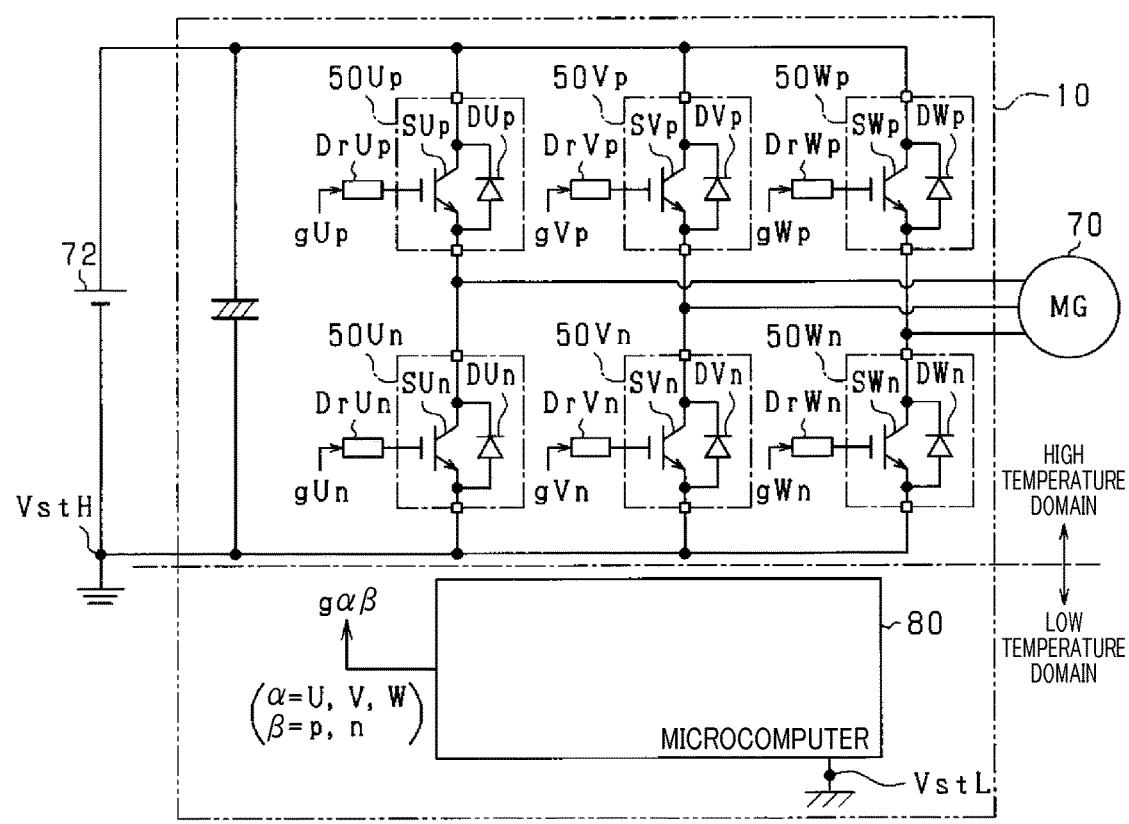
FIG. 3 is a schematic diagram of a motor control system in accordance with the first embodiment.

As shown in FIG. 3, the motor control system includes the three-phase inverter 10 and a motor generator 70. The motor generator 70 is connected to a driven wheel (not shown) and acts as a vehicle prime mover or the like. In the present embodiment, a one-motor control system including one motor generator 70 is used as the motor control system. A permanent magnet synchronous electrical motor may be used as the motor generator 70.

The three-phase inverter 10 is electrically connected to a high-voltage battery 72, such as a lithium-ion secondary battery, a nickel-metal-hydride secondary battery or the like, as a direct-current (DC) power source.

Collector terminals of the U-, V-, W-phase upper-arm switching elements SUp, SVp, SWp of the respective U-, V-, W-phase upper-arm semiconductor modules 50Up, 50Vp 50Wp are electrically connected to each other. Emitter terminals of the U-, V-, W-phase lower-arm switching elements SUn, SVn, SWn of the respective U-, V-, W-phase lower-arm semiconductor modules 50Un, 50Vn, 50Wn are electrically connected to each other. The collector terminals are electrically connected to a positive terminal of the high-voltage battery 72. The emitter terminals are electrically connected to a negative terminal of the high-voltage battery 72.

An emitter terminal of the α-phase upper-arm switching element Sαp (α=U, V, W) is electrically connected to a collector terminal of the α-phase lower-arm switching element Sαn. A junction between the emitter terminal of the α-phase upper-arm switching element Sαp and the collector terminal of the α-phase lower-arm switching element Sαn is electrically connected to an α-phase terminal of the motor generator 70.

The three-phase inverter 10 includes a microcomputer 80 and drive circuits Drαβ (α=U, V, W: β=p, n). The microcomputer 80 includes a central processing unit (CPU) and others to generate operation signals gαβ and output the operation signals gαβ to the respective drive circuits Drαβ, thereby controlling a controlled variable (e.g., torque) of the motor generator 70 to a command value. Each drive circuit Drαβ is a gate drive circuit for charging and discharging a gate of the switching element Sαβ in response to the operation signal gαβ. The switching element Sαβ is turned on and off by the drive circuit Drαβ. The operation signals gαβ are signals for passing sinusoidal currents that are 120 degrees out of phase. For example, the operation signals gαβ may be generated in the well-known field-oriented control loop.

In the present embodiment, the vehicle includes a high-voltage domain and a low-voltage domain. The high-voltage domain includes the motor generator 70, the high-voltage battery 72, the semiconductor modules 50αβ and the drive circuits Drαβ (α=U, V, W: β=p, n). The low-voltage domain includes the microcomputer 80. A reference potential VstL of the low-voltage domain and a reference potential VstH of the high-voltage domain are different from each other. In the present embodiment, the reference potential VstH of the high-voltage domain is set to a negative-electrode potential of the high-voltage battery 72, and the reference potential VstL of the low-voltage domain is set to a potential of the vehicle body that is a median of the positive-electrode and negative-electrode potentials of the high-voltage battery 72.

Figure 4:
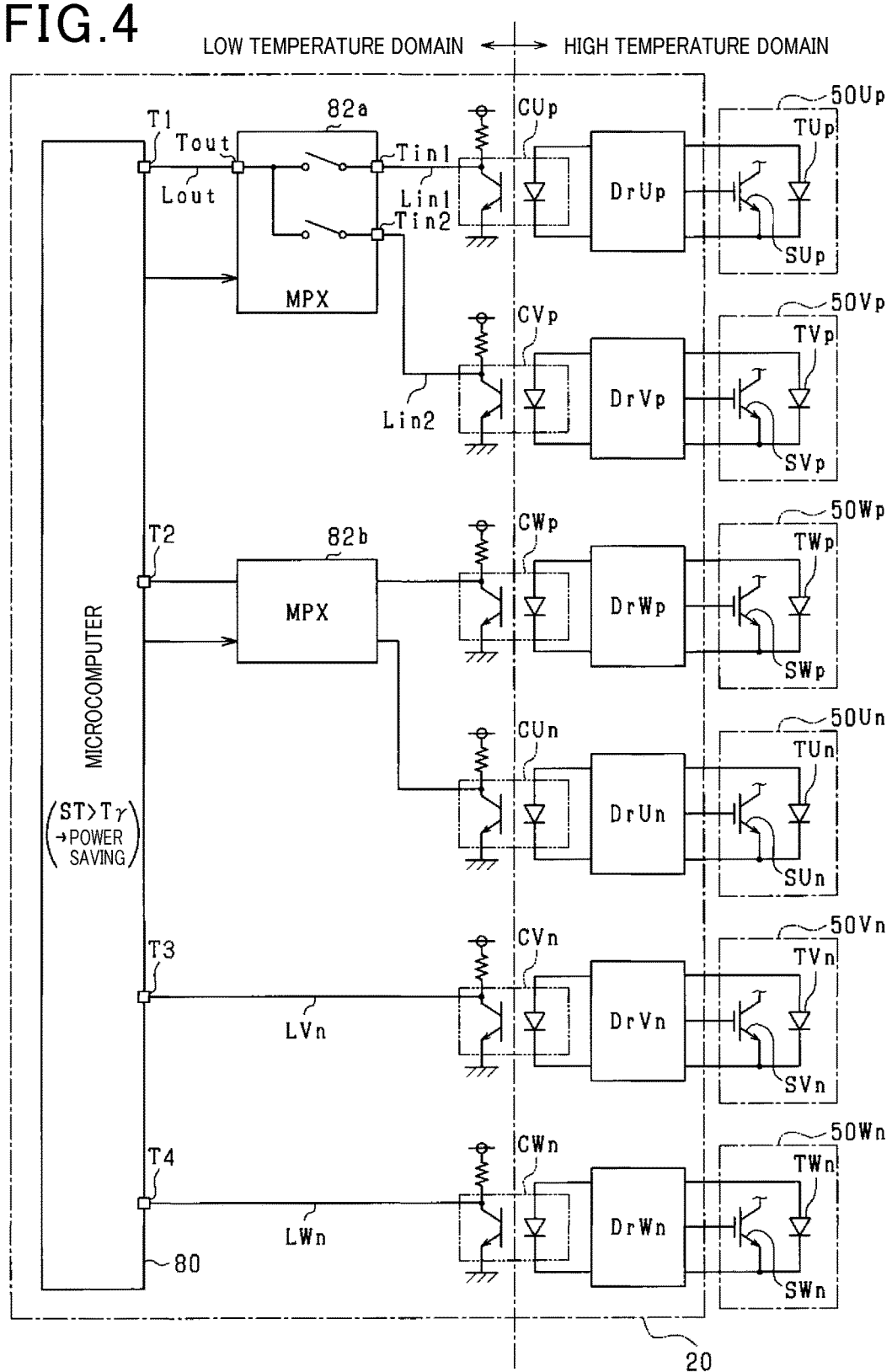
FIG. 4 is a schematic circuit diagram for transferring temperature signals in accordance with the first embodiment.

Temperature detection for the respective switching elements Sαβ (α=U, V, W: β=p, n) will now be explained with reference to FIG. 4. FIG. 4 shows various electronic components mounted on the respective semiconductor modules 50αβ and the circuit board 20.

As shown in FIG. 4, the drive circuits Drαβ (α=U, V, W: β=p, n), photocouplers Cαβ (α=U, V, W: β=p, n), first and second multiplexers 82a, 82b, and the microcomputer 80 are mounted on the circuit board 20. Each of the first and second multiplexers 82a, 82b has two input ports (first input port Tin1, second input port Tin2), and one output port Tout. In the present embodiment, each of the first and second multiplexers 82a, 82b corresponds to an input-output interface.

The drive circuits Drαβ are configured to receive temperature signals from the respective temperature-sensitive diodes Tαβ. In the present embodiment, the temperature-sensitive diodes Tαβ are supplied with current from a constant current source (not shown). Therefore, the temperature-sensitive diodes Tαβ are configured to output voltage signals negatively correlated to temperatures of the respective switching elements Sαβ. In the present embodiment, each temperature-sensitive diode Tαβ corresponds to a temperature signal output.

The drive circuits Drαβ are configured to receive the temperature signals from the respective temperature-sensitive diodes Tαβ. The drive circuit Drαβ are configured to output the received temperature signals to the respective photocouplers Cαβ. In the present embodiment, each drive circuit Drαβ is configured to, based on comparison of the received temperature signal from the temperature-sensitive diode Tαβ with a carrier signal (e.g., a triangular waveform signal) in magnitude, convert the temperature signal into a duty ratio signal (referred to as a duty signal) and output the duty ratio signal to the photocoupler Cαβ.

Each photocoupler Cαβ is an optical insulating transfer element configured to transmit a signal from the high voltage domain to the low voltage domain while electrically isolating the high and low voltage domains from each other. At an input (photodiode-side) of the photocoupler Cαβ is received the temperature signal (i.e., the duty ratio signal) of the temperature-sensitive diode Tαβ from the drive circuit Drαβ.

From an output (phototransistor-side) of each of the U-, V-phase upper-arm photocouplers CUp, CVp, the temperature signal is input to the microcomputer 80 via the first multiplexer 82a. More specifically, the output of the U-phase upper-arm photocoupler CUp is connected directly to the first input port Tin1 of the first multiplexer 82a via a first input channel Lin1. The output of the V-phase upper-arm photocoupler CVp is connected directly to the second input port Tin2 of the first multiplexer 82a via a second input channel Lin2. In the present embodiment, the input channels Lin1, Lin2 use a wiring pattern formed on the circuit board 20.

An output port Tout of the first multiplexer 82a is connected directly to a first input port T1 of the microcomputer 80 via an output channel Lout. In the present embodiment, the output channel Lout uses the wiring pattern formed on the circuit board 20. The first multiplexer 82a is configured to sequentially select one of the first and second input ports Tin1, Tin2 to be connected to the output port Tout at predetermined time intervals based on a switching signal (e.g., a bit signal) received from the microcomputer 80. This allows the temperature signal received at the output port Tout to be alternately switched between the temperature signal received at the first input port Tin1 and the temperature signal received at the second input port Tin2 at the predetermined time intervals.

From an output (phototransistor-side) of each of the W-phase upper-arm photocoupler CWp and the U-phase lower-arm photocoupler CUn, the temperature signal is input to a second input port T2 of the microcomputer 80 via the second multiplexer 82b. A transferring manner of the temperature signal via the second multiplexer 82b is similar to that of the temperature signal via the first multiplexer 82a. Therefore, a detailed description about the transferring manner of the temperature signal via the second multiplexer 82b will not be given here.

An output of the V-phase lower-arm photocoupler CVn is connected directly to a third input port Tin3 of the microcomputer 80 via a V-phase lower-arm electrical path LVn. An output of the W-phase lower-arm photocoupler CWn is connected directly to a fourth input port Tin4 of the microcomputer 80 via a V-phase lower-arm electrical path LWn. In the present embodiment, the electrical paths LVn, LWn use the wiring pattern formed on the circuit board 20.

The microcomputer 80 is configured to detect temperatures of the six switching elements Sαβ (α=U, V, W: β=p, n) based on the temperature signals received at the input ports T1 through T4. The microcomputer 80 is configured to perform a power saving process when determining that the highest one ST of the temperatures of the six switching elements exceeds a threshold temperature Tγ. In the power saving process, the microcomputer 80 de-energizes the switching elements Sαβ or reduces power supplied to the switching elements Sαβ, thereby the respective switching elements Sαβ from overheating.

The temperature sensing configuration as described above is employed to prevent the respective switching elements Sαβ from overheating and prevent enlargement of a temperature range where use of the respective switching elements Sαβ is restricted.

The V-phase lower-arm switching element SVn is a switching element that is assumed at the time of designing to be hottest during use among the six switching elements Sαβ. However, another switching element may be hottest during use among the six switching elements Sαβ due to aging of the three-phase inverter 10 or the like. Therefore, in such a case, even if the power saving process is performed based on the temperature signal of the V-phase lower-arm switching element SVn from the temperature-sensitive diode, the overheat condition of the other switching elements could not be avoided reliably.

Figure 5:
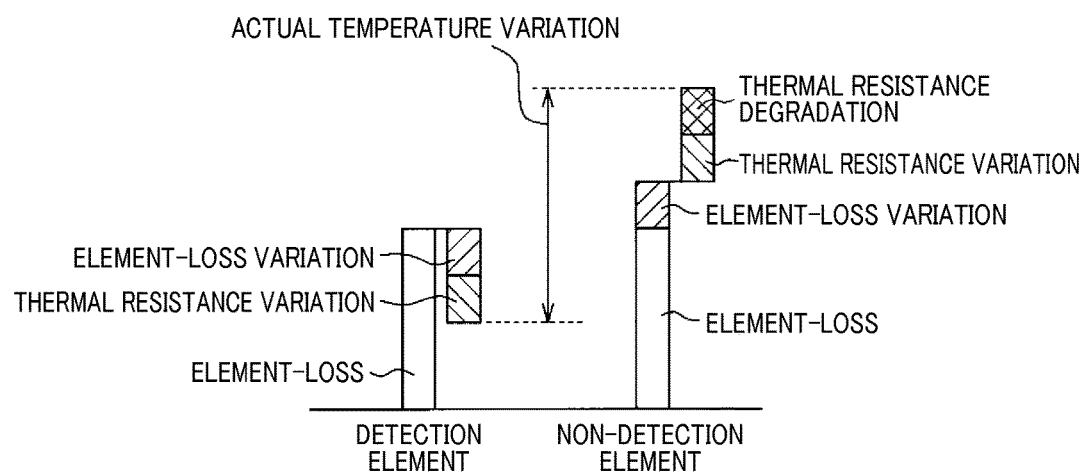
FIG. 5 is a schematic of temperature estimation errors for IGBTs.

In addition, the temperatures of the switching elements Sαβ may vary during flowing of the collector currents through the respective switching elements Sαβ due to aging or individual difference of the switching elements. Therefore, when temperatures of some of the six switching elements Sαβ are detected, the threshold temperature Tγ that is used to performed the power saving process needs to be set lower than an upper limit by a large margin for safety, below which upper limit the reliability of the switching elements Sαβ can retained. Temperature variations of the switching elements will now be explained with reference to FIG. 5. In FIG. 5, a "detection element" refers to a switching element, a temperature of which is detected, and a "non-detection element" refers to a switching element, a temperature of which is not detected.

FIG. 5 shows an example case that a temperature error of each of the detection element and the non-detection element is a maximum with the same collector current flowing through the detection element and the non-detection element. In FIG. 5, an "element loss" refers to an average temperature over a plurality of mass-produced switching elements. An "element-loss variation" refers to a variation from the average temperature. A "thermal resistance variation" refers to a variation in temperature among the switching elements caused by a variation in thermal resistance among new semiconductor modules. A "thermal resistance degradation" refers to an amount of temperature increase of the switching element caused by thermal resistance variation due to aging of the semiconductor module.

For the detection element, the element-loss minus (the element-loss variation plus the thermal resistance variation) gives a temperature detected by the temperature-sensitive diode. In the example of FIG. 5, although the same collector current flows though the detection element and the non-detection element, the temperature of the non-detection element is greater than the temperature of the detection element. In this case, a temperature of the non-detection element is a sum of the element loss, the element-loss variation, the thermal resistance variation, and the thermal resistance degradation. A difference in temperature between the detection element and the non-detection element gives an actual temperature variation.

For example, when the actual temperature variation is 20° C. and the upper limit of temperatures of the switching elements is 150° C., the threshold temperature Tγ that is used to performed the power saving process needs to be set to 130° C. to protect the non-detection element from overheating. Thus, the threshold temperature Tγ is set lower than the upper limit by a large margin for safety, which may cause the power saving process to be performed even though the temperature of the non-detection element has not reached the upper-limit temperature. In such a case, there is a concern that the collector current can be no more increased even if the collector current may be further increased. That is, there is a disadvantage that a temperature range where use of the switching elements is restricted may enlarge.

To overcome such a problem, in the present embodiment, temperatures of the six switching elements Sαβ are detected.

There are some benefits associated with the present embodiment set forth above.

(1) The temperatures of all the six switching elements Sαβ are detected. Therefore, the hottest switching element among the six switching elements Sαβ during use can be determined by the microcomputer 80 even if the hottest switching element among the six switching elements Sαβ during use is changed from the switching element that is assumed at the time of designing to be hottest among the six switching elements Sαβ during use to another one of the six switching elements Sαβ. This can prevent the six switching elements Sαβ from overheating and prevent enlargement of a temperature range where the maximum value of the available collector current is constrained, even when it is difficult to determine the hottest switching element among the six switching elements Sαβ only from information about the positions of the respective semiconductor modules within the cooler.

(2) The temperature signals outputted from two of the six temperature-sensitive diodes Tαβ, that is, the two temperature-sensitive diodes TVn, TWn, are transferred from the outputs of the photocouplers CVn, CWn to the microcomputer 80 via the electrical paths LVn, LWn without passing through the multiplexers 82a, 82b. Each of the electrical paths LVn, LWn directly connecting one of the outputs of the photocouplers CVn, CWn and the microcomputer 80 can be a path for transferring the temperature signals in the event that the multiplexers 82a, 82b fail. Thus, in the present embodiment, even if the multiplexers 82a, 82b fail, fail-safe, such as power saving, can be achieved based on the temperatures of the switching elements SVn, SWn. This can avoid substantial degradation of the reliability of the three-phase inverter 10.

Particularly, in the present embodiment, only the V-phase lower-arm temperature-sensitive diode TVn and the W-phase lower-arm temperature-sensitive diode TWn output the temperature signals that are input directly to the microcomputer 80. The V-phase lower-arm switching element SVn is assumed at the time of designing to be hottest among the six switching elements Sαβ during use. The W-phase lower-arm switching element SWn is assumed to be second hottest among the six switching elements Sαβ during use. Therefore, even if another switching element is actually hottest among the six switching elements Sαβ during use due to aging of the three-phase inverter 10 or the like, the temperatures of The V-phase lower-arm switching element SVn and the W-phase lower-arm switching element SWn are likely to remain at higher levels than the average temperature over the six switching elements Sαβ. Therefore, in the present embodiment, even if the multiplexers 82a, 82b fail, the power saving can properly protect the switching elements Sαβ from overheating.

(3) Paths of the temperature signals from four of the six temperature-sensitive diodes Tαβ, that is, the temperature-sensitive diodes Tαp (α=U, V, W), TUn, to the microcomputer 80 are realized by the two multiplexers 82a, 82b. This can reduce the number of input ports of the microcomputer 80 required to detect temperatures of the six switching elements Sαβ to less than the total number of switching elements Sαβ. This allows the microcomputer 80 to detect the temperatures of all the six switching elements Sαβ even in the presence of a limited number of input ports of the microcomputer 80, which allows the three-phase inverter 10 to be downsized and costs of the three-phase inverter 10 to be reduced.

(4) The multiplexers 82a, 82b are used, each of which has two inputs and one output. In each of the multiplexers 82a, 82b, the input to be connected to the output port Tout is alternately switched between the two input ports Tin1, Tin2. This causes a delay between when the temperature signal is received at one of the two input ports and when the temperature signal is output from the output port Tout to the microcomputer 80. The delay increases with an increasing number of input ports. A difference in delay between the multiplexers 82a, 82b increases with an increasing difference in number of input ports between the multiplexers 82a, 82b. Time intervals between detection of temperatures of each of the switching elements associated with one of the multiplexers 82a, 82b having a larger number of input ports are greater than time intervals associated with the other of the multiplexers 82a, 82b. Therefore, there is a concern that overheat protection for the switching elements by the power saving may be delayed. In the present embodiment, the multiplexers 82a, 82b have an equal number of input ports, which can reduce variations in time required for the temperature signals to be transferred from the respective temperature-sensitive diodes Tαp, TUn to the microcomputer 80 via signal transferring paths passing though the respective multiplexers 82a, 82b. This can prevent the time intervals between detection of temperatures of each of the switching elements Sαp, SUn from increasing, thereby preventing overheat protection from being delayed.

Particularly, in the present embodiment, the number of input ports of each of the multiplexers 82a, 82b is set to two. This can minimize the time intervals between detection of temperatures of each of the switching elements Sαp, SUn are detected.

Second Embodiment

There will now be explained a second embodiment of the present invention. Only differences of the second embodiment from the first embodiment will be explained with reference to the accompanying drawings.

Figure 6:
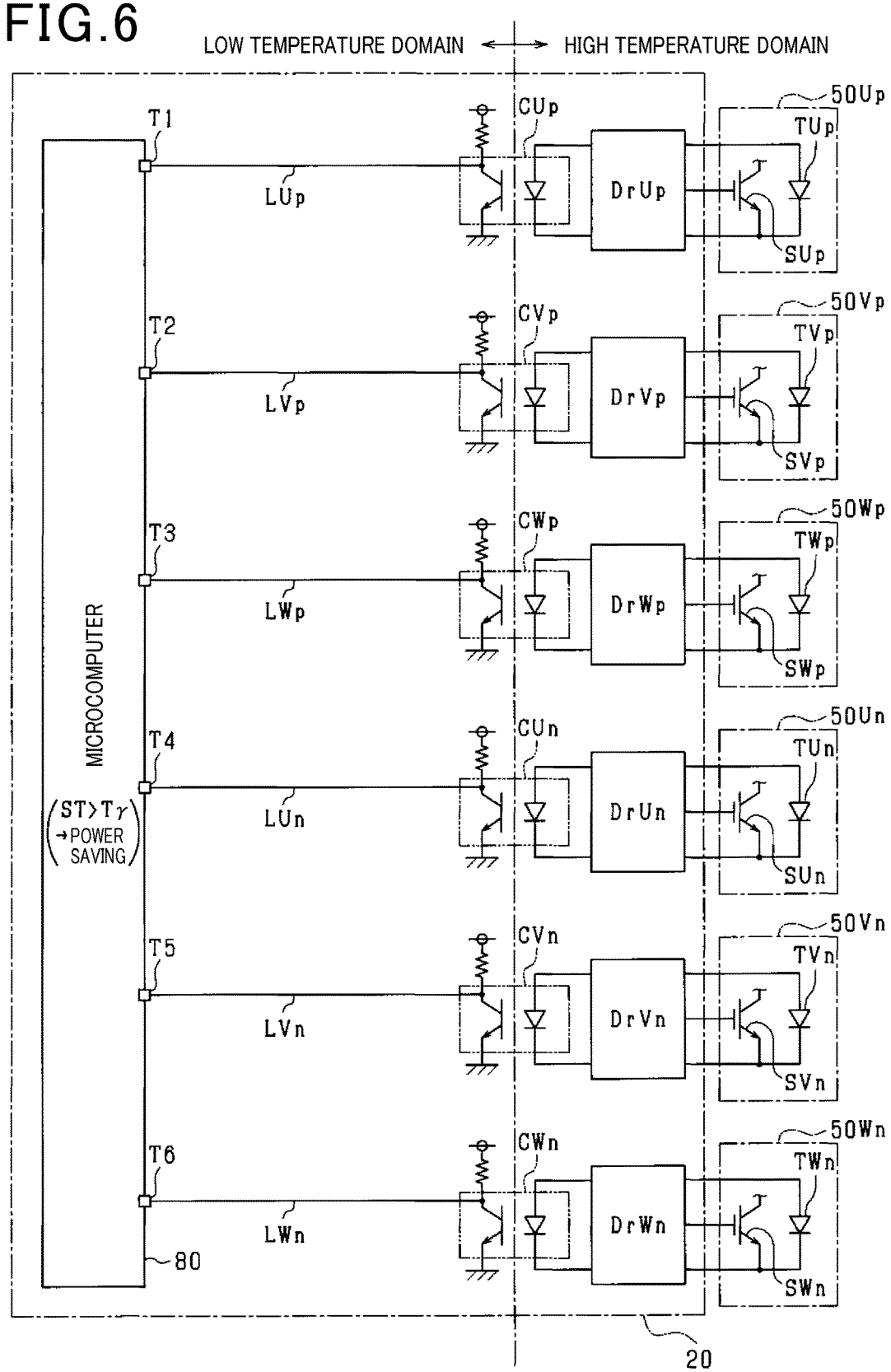
FIG. 6 is a schematic circuit diagram for transferring temperature signals in accordance with a second embodiment of the present invention.

As shown in FIG. 6, the microcomputer 80 of the present embodiment includes first to sixth input ports t1-t6. The first to third input ports T1, T2, T3 are electrically connected directly to outputs of the U-, V-, W-phase upper-arm photocouplers CUp, CVp, CWp via U-, V-, W-phase upper-arm electrical paths LUp, LVp, LWp. Fourth to sixth input ports T4, T5, T6 of the microcomputer 80 are electrically connected directly to outputs of the U-, V-, W-phase lower-arm photocouplers CUn, CVn, CWn via U-, V-, W-phase lower-arm electrical paths LUn, LVn, LWn. In the present embodiment, the α-phase upper- and lower-arm electrical paths Lαp, Lαn (α=U, V, W) may use the wiring pattern of the circuit board 20.

The present embodiment described above can also prevent each of the six switching elements Sαβ from overheating, and can also prevent enlargement of a temperature range where the available flow of collector current is constrained.

Third Embodiment

Figure 7:
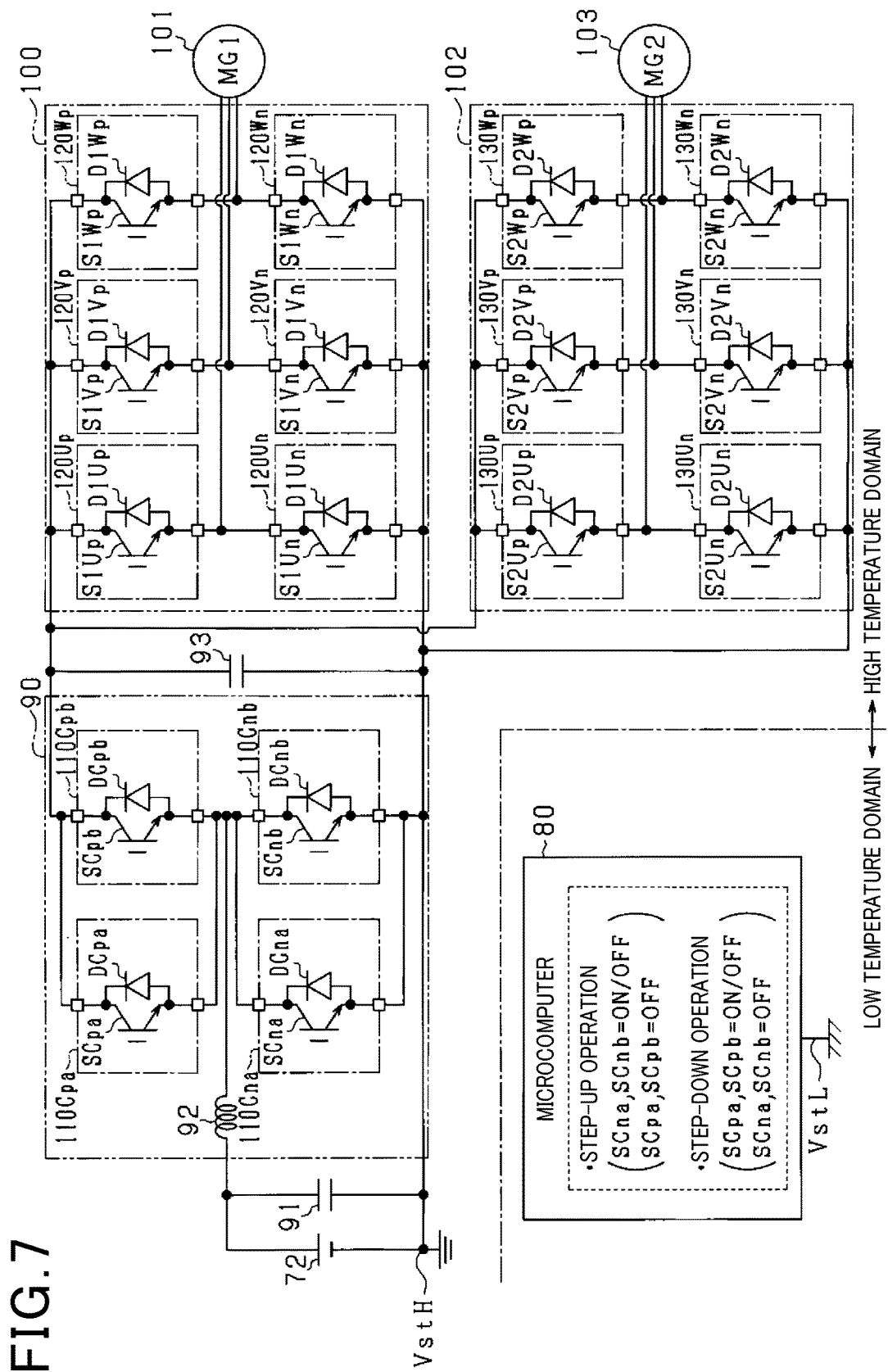
FIG. 7 is a schematic diagram of a motor control system in accordance with a third embodiment of the present invention.

There will now be explained a third embodiment of the present invention. Only differences of the third embodiment from the first embodiment will be explained with reference to the accompanying drawings. In the present embodiment, a two-motor control system including two motor generators (rotating electric machines) is used as a control system. More specifically, as shown in FIG. 7, the control system includes an buck-boost converter 90, a first inverter 100, a first motor generator 101, a second inverter 102, a second motor generator 103, and a microcomputer 80. Each of the motor generators 101, 103 may be a permanent magnet synchronous electrical motor. Elements having similar functions as in the first embodiment (see FIG. 1) are assigned the same numbers.

The buck-boost converter 90 includes an input capacitor 91, a reactor 92, voltage-transformation switching elements SCpa, SCpb, SCna, SCnb, freewheel diodes DCpa, DCpb, DCna, DCnb electrically connected in anti-parallel with the respective voltage-transformation switching elements, and a smoothing capacitor 93. In the present embodiment, an insulated gate bipolar transistors (IGBT) is used for each of the voltage-transformation switching elements SCpa, SCpb, SCna, SCnb.

The buck-boost converter 90 includes a plurality of (e.g., two) upper-arm switching elements and a plurality of (e.g., two) lower-arm switching elements electrically connected in parallel with the plurality of upper-arm switching elements. More specifically, collectors of the respective upper-arm voltage-transformation switching elements SCpa, SCpb are electrically connected to each other, and emitters of the respective upper-arm voltage-transformation switching elements SCpa, SCpb are electrically connected to each other. In addition, collectors of the respective lower-arm voltage-transformation switching elements SCna, SCnb are electrically connected to each other, and emitters of the lower-arm voltage-transformation switching elements SCna, SCnb are electrically connected to each other. A series connection of the upper-arm voltage-transformation switching elements SCpa, SCpb and the lower-arm voltage-transformation switching elements SCna, SCnb is electrically connected in parallel with the smoothing capacitor 93. As in the first embodiment, the voltage-transformation switching elements SCpa, SCpb, SCna, SCnb, together with the respective freewheel diodes DCpa, DCpb, DCna, DCnb and respective temperature-sensitive diodes (not shown), form semiconductor modules 110Cpa, 110Cpb, 110Cna, 110Cnb, respectively.

A first end of the reactor 92 is electrically connected to a junction between the upper-arm transformer switching elements SCpa, SCpb and the lower-arm voltage-transformation switching elements SCna, SCnb. A second end of the reactor 92 is electrically connected to a positive terminal of a high-voltage battery 72. A negative terminal of the high-voltage battery 72 is electrically connected to the emitters of the lower-arm voltage-transformation switching elements SCna, SCnb. An input capacitor 91 is electrically connected to the high-voltage battery 72.

The first inverter 100 includes U-, V-, W-phase upper-arm switching elements S1Up, S1Vp, S1Wp, and U-, V-, W-phase lower-arm switching elements S1Un, S1Vn, S1Wn. The switching elements S1Up, S1Vp, S1Wp, S1Un, S1Vn, S1Wn are electrically connected in anti-parallel with respective freewheel diodes D1Up, D1Vp, D1Wp, D1Un, D1Vn, D1Wn. As in the first embodiment, the switching elements S1Up, S1Vp, S1Wp, S1Un, S1Vn, S1Wn, together with the respective freewheel diodes D1Up, D1Vp, D1Wp, D1Un, D1Vn, D1Wn and respective temperature-sensitive diodes (not shown), form semiconductor modules 120Up, 120Vp, 120Wp, 120Un, 120Vn, 120Wn, respectively.

The second an inverter 102 includes U-, V-, W-phase upper-arm switching elements S2Up, S2Vp, S2Wp, and U-, V-, W-phase lower-arm switching elements S2Un, S2Vn, S2Wn. The switching elements S2Up, S2Vp, S2Wp, S2Un, S2Vn, S2Wn are electrically connected in anti-parallel with respective freewheel diodes D2Up, D2Vp, D2Wp, D2Un, D2Vn, D2Wn. As in the first embodiment, the switching elements S2Up, S2Vp, S2Wp, S2Un, S2Vn, S2Wn, together with the respective freewheel diodes D2Up, D2Vp, D2Wp, D2Un, D2Vn, D2Wn and respective temperature-sensitive diodes (not shown), form semiconductor modules 130Up, 130Vp, 130Wp, 130Un, 130Vn, 130Wn, respectively.

Each of the first and second inverter 100, 102 has a similar configuration to that of the three-phase inverter 10 of the first embodiment. Therefore, in the present embodiment, a detailed description about the first and second inverter 100, 102 will not be given here.

The first inverter 100 is electrically connected to the first motor generator 101. The first motor generator 101 acts as an alternator and as a starter for applying an initial torque to a crankshaft of a vehicle engine. The second inverter 102 is electrically connected to the second motor generator 103. Like the motor generator 70 of the first embodiment, the second motor generator 103 acts as a prime mover or the like.

The microcomputer 80 is configured to output operation signals to drive circuits (not shown) of the respective switching elements S1Up, S1Vp, S1Wp, S1Un, S1Vn, S1Wn to drive the first motor generator 101 as an alternator. This allows an alternating voltage input from the first motor generator 101 to the first inverter 100 to be converted into a direct voltage, which in turn is applied to the buck-boost converter 90. In the present embodiment, the operation signals are generated through a PWM process based on comparison of U-, V-, W-phase output voltage command values for the first inverter 100 with a carrier signal (e.g., a triangular waveform signal) in magnitude. The operation signals thus generated for the respective three phases of the first motor generator 101 are, for example, signals for providing U-, V-, W-phase sinusoidal currents for the first motor generator 101 that are 120 degrees out of phase in electric angle.

The microcomputer 80 is configured to output operation signals to drive circuits (not shown) of the respective switching elements S2Up, S2Vp, S2Wp, S2Un, S2Vn, S2Wn to motoring-drive the second motor generator 103 as an electrical motor or regeneration-drive the second motor generator 103 as an alternator. In motoring drive, a direct voltage input from the buck-boost converter 90 to the second inverter 102 is converted into an alternating voltage, which in turn is applied to the second motor generator 103. In regeneration drive, an alternating voltage input from the second motor generator 103 to the second inverter 102 is converted into a direct voltage, which in turn is applied to the buck-boost converter 90. In the present embodiment, the operation signals are generated through the PWM process.

The microcomputer 80 is configured to output operation signals to drive circuits (not shown) of the respective voltage-transformation switching elements SCpa, SCpb, SCna, SCnb to drive the buck-boost converter 90 as a boost converter or drive the buck-boost converter 90 as a buck converter. More specifically, in voltage step-up operation to motoring-drive the second motor generator 103, both the lower-arm voltage-transformation switching elements SCna, SCnb are turned on and off in synchronization with each other with both the upper-arm voltage-transformation switching elements SCpa, SCpb kept in an off-state. In voltage step-down operation to regeneration-drive the second motor generator 103, the upper-arm voltage-transformation switching elements SCpa, SCpb are turned on and off in synchronization with each other with both the lower-arm voltage-transformation switching elements SCna, SCnb kept in an off-state.

A frequency of the carrier signal (e.g., 5 kHz) used to generate the operation signals for each of the inverters 100, 102 is set lower than a frequency of the carrier signal (e.g., 10 kHz) used to generate the operation signals for the buck-boost converter 90.

Figure 8:
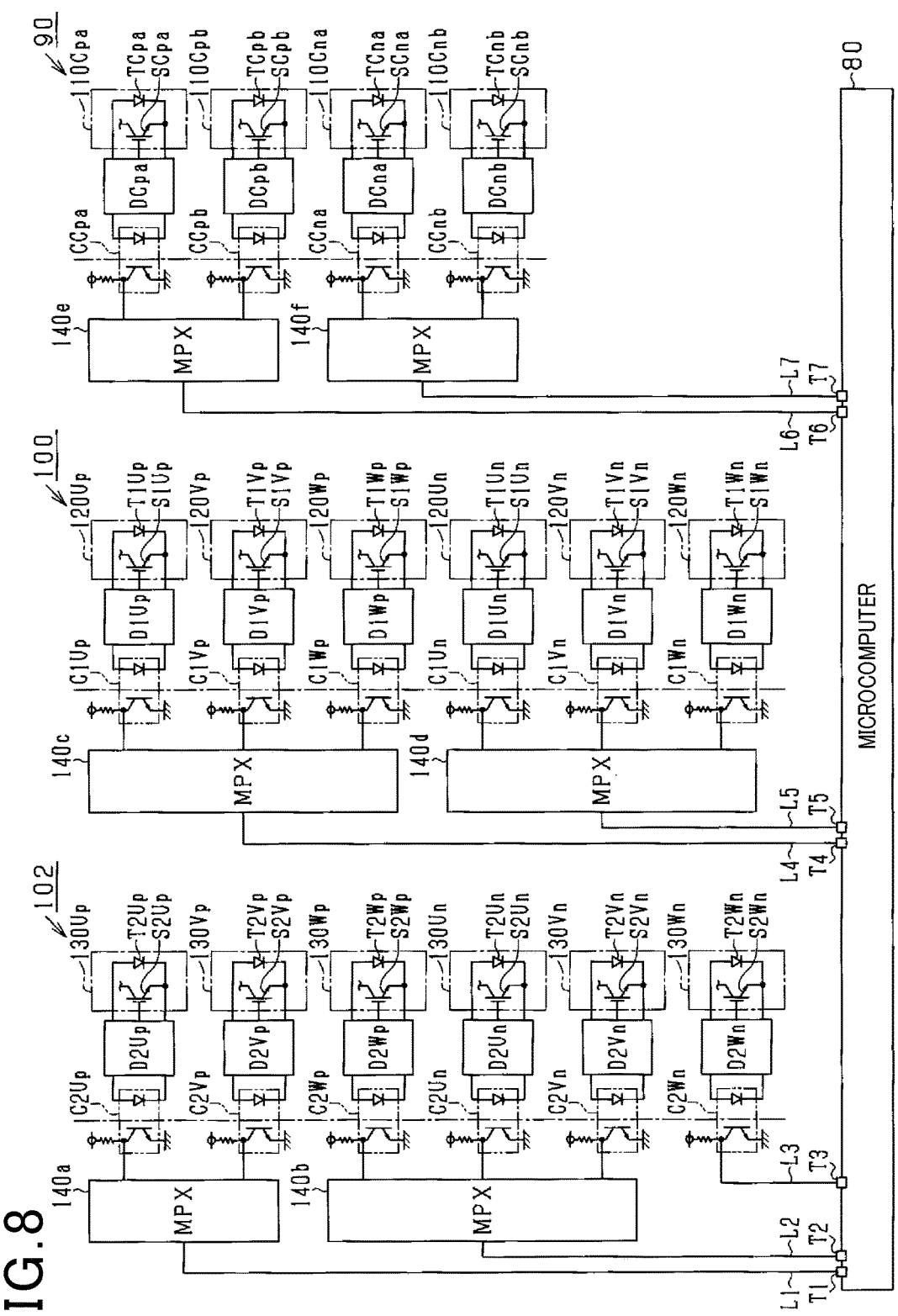
FIG. 8 is a schematic circuit diagram for transferring temperature signals in accordance with the third embodiment.

A configuration for detecting temperatures of the respective switching elements will now be explained with reference to FIG. 8. FIG. 8 corresponds to FIG. 4 of the first embodiment. In FIG. 8, the circuit board 20 is not shown.

As shown in FIG. 8, the drive circuits D2Up, D2Vp, D2Wp, D2Un, D2Vn, D2Wn configured to drive the respective switching elements S2Up, S2Vp, S2Wp, S2Un, S2Vn, S2Wn forming the second an inverter 102, photocouplers C2Up, C2Vp, C2Wp, C2Un, C2Vn, C2Wn, first and second multiplexers 140a, 140b, and the microcomputer 80 are mounted on the circuit board. In the present embodiment, the first multiplexer 140a has two input ports and one output port, and the second multiplexer 140b has three input ports and one output port. The drive circuits D2Up, D2Vp, D2Wp, D2Un, D2Vn, D2Wn are configured to receive temperature signals from temperature-sensitive diodes T2Up, T2Vp, T2Wp, T2Un, T2Vn, T2Wn for detecting temperatures of the respective switching elements S2Up, S2Vp, S2Wp, S2Un, S2Vn, S2Wn. The drive circuits D2Up, D2Vp, D2Wp, D2Un, D2Vn, D2Wn are configured to convert the received temperature signals into duty signals, which in turn are input to the respective photocouplers C2Up, C2Vp, C2Wp, C2Un, C2Vn, C2Wn.

The drive circuits D1Up, D1Vp, D1Wp, D1Un, D1Vn, D1Wn are configured to drive the respective switching elements S1Up, S1Vp, S1Wp, S1Un, S1Vn, S1Wn forming the first inverter 100, photocouplers C1Up, C1Vp, C1Wp, C1Un, C1Vn, C1Wn, and third and fourth multiplexers 140c, 140d are mounted on the circuit board. In the present embodiment, each of the third and fourth multiplexers 140c, 140d has three input ports and one output port. The drive circuits D1Up, D1Vp, D1Wp, D1Un, D1Vn, D1Wn are configured to receive temperature signals from temperature-sensitive diodes T1Up, T1Vp, T1Wp, T1Un, T1Vn, T1Wn for detecting temperatures of the respective switching elements S1Up, S1Vp, S1Wp, S1Un, S1Vn, S1Wn. The drive circuits D1Up, D1Vp, D1Wp, D1Un, D1Vn, D1Wn are configured to convert the received temperature signals into duty signals, which in turn are input to the respective photocouplers C1Up, C1Vp, C1Wp, C1Un, C1Vn, C1Wn.

The drive circuits DCpa, DCpb, DCna, DCnb are configured to drive the respective switching elements SCpa, SCpb, SCna, SCnb forming the buck-boost converter 90, photocouplers CCpa, CCpb, CCna, CCnb, and fifth and sixth multiplexers 140e, 140f are mounted on the circuit board. In the present embodiment, each of the fifth and sixth multiplexers 140e, 140f has two input ports and one output port. The drive circuits DCpa, DCpb, DCna, DCnb are configured to receive temperature signals from temperature-sensitive diodes TCpa, TCpb, TCna, TCnb for detecting temperatures of the respective switching elements SCpa, SCpb, SCna, SCnb. The drive circuits DCpa, DCpb, DCna, DCnb are configured to convert the received temperature signals into duty signals, which in turn are input to the respective photocouplers CCpa, CCpb, CCna, CCnb.

Temperature signals outputted from outputs of the respective U-, V-phase upper-arm photocouplers C2Up, C2Vp are input to the respective input ports of the first multiplexer 140a. The output port of the first multiplexer 140a is electrically connected to a first input port T1 of the microcomputer 80 via a first electrical path L1. Outputs of the respective W-phase upper-arm photocoupler C2Wp and U-, V-phase lower-arm photocouplers C2Un, C2Vn are electrically connected to a second input port T2 of the microcomputer 80 via the second multiplexer 140b and a second electrical path L2. An output of the W-phase lower-arm photocoupler C2Wn is electrically connected to a third input port T3 of the microcomputer 80 via a third electrical path L3.

Outputs of the respective U-, V-, W-phase upper-arm photocouplers C1Up, C1Vp, C1Wp are electrically connected to a fourth input port T4 of the microcomputer 80 via a third multiplexer 140c and a fourth electrical path L4. Outputs of the respective U-, V-, W-phase lower-arm photocouplers C1Un, C1Vn, C1Wn are electrically connected to a fifth input port T5 of the microcomputer 80 via a fourth multiplexer 140d and a fifth electrical path L5.

Outputs of the respective upper-arm voltage-transformation photocouplers CCpa, CCpb are electrically connected to a sixth input port T6 of the microcomputer 80 via a fifth multiplexer 140e and a sixth electrical path L6. Outputs of the respective lower-arm voltage-transformation photocouplers CCna, CCnb are electrically connected to a seventh input port T7 of the microcomputer 80 via a sixth multiplexer 140f and a seventh electrical path L7.

The microcomputer 80 is configured to detect temperatures of the respective whole switching elements forming the first inverter 100, the second inverter 102, and the buck-boost converter 90 based on the temperature signals received at the respective input port T1-T7 of the microcomputer 80. The microcomputer 80 is configured to, when determining that the highest one ST of the detected temperatures exceeds a threshold temperature Tγ, conduct the power saving process.

In the present embodiment, a temperature signal from the temperature-sensitive diode T2Wn associated with the W-phase lower-arm switching element S2Wn forming the second inverter 102 is input to the microcomputer 80 without passing through any multiplexer. This is because, among the buck-boost converter 90, the first inverter 100, and the second inverter 102, the switching elements forming the second inverter 102 may be assumed to be hotter than the switching elements forming the buck-boost converter 90 and the first inverter 100 during use. Particularly, in the present embodiment, among the switching elements forming the second inverter 102, the W-phase lower-arm switching element S2Wn is assumed to be hottest during use.

The two-motor control system in a buck and boost configuration of the present embodiment can provide similar advantages to those of the first embodiment.

Further, in the present embodiment, only the temperature signals of the respective switching elements forming the second inverter 102 are input to the first and second multiplexers 140a, 140b. Only the temperature signals of the respective switching elements forming the first inverter 100 are input to the third and fourth multiplexers 140c, 140d. Only the temperature signals of the respective switching elements forming the buck-boost converter 90 are input to the fifth and sixth multiplexers 140e, 140f. In such a configuration, the microcomputer 80 can readily determine each of the temperature signals received at the respective input ports of the microcomputer 80 corresponds to which of the buck-boost converter 90, the first inverter 100, and the second inverter 102. For example, when a signal received at one of the input ports of the microcomputer 80 indicating the presence of an abnormality, the microcomputer 80 can determine the signal has come from which of the buck-boost converter 90, the first inverter 100, and the second inverter 102.

Fourth Embodiment

Figure 9:
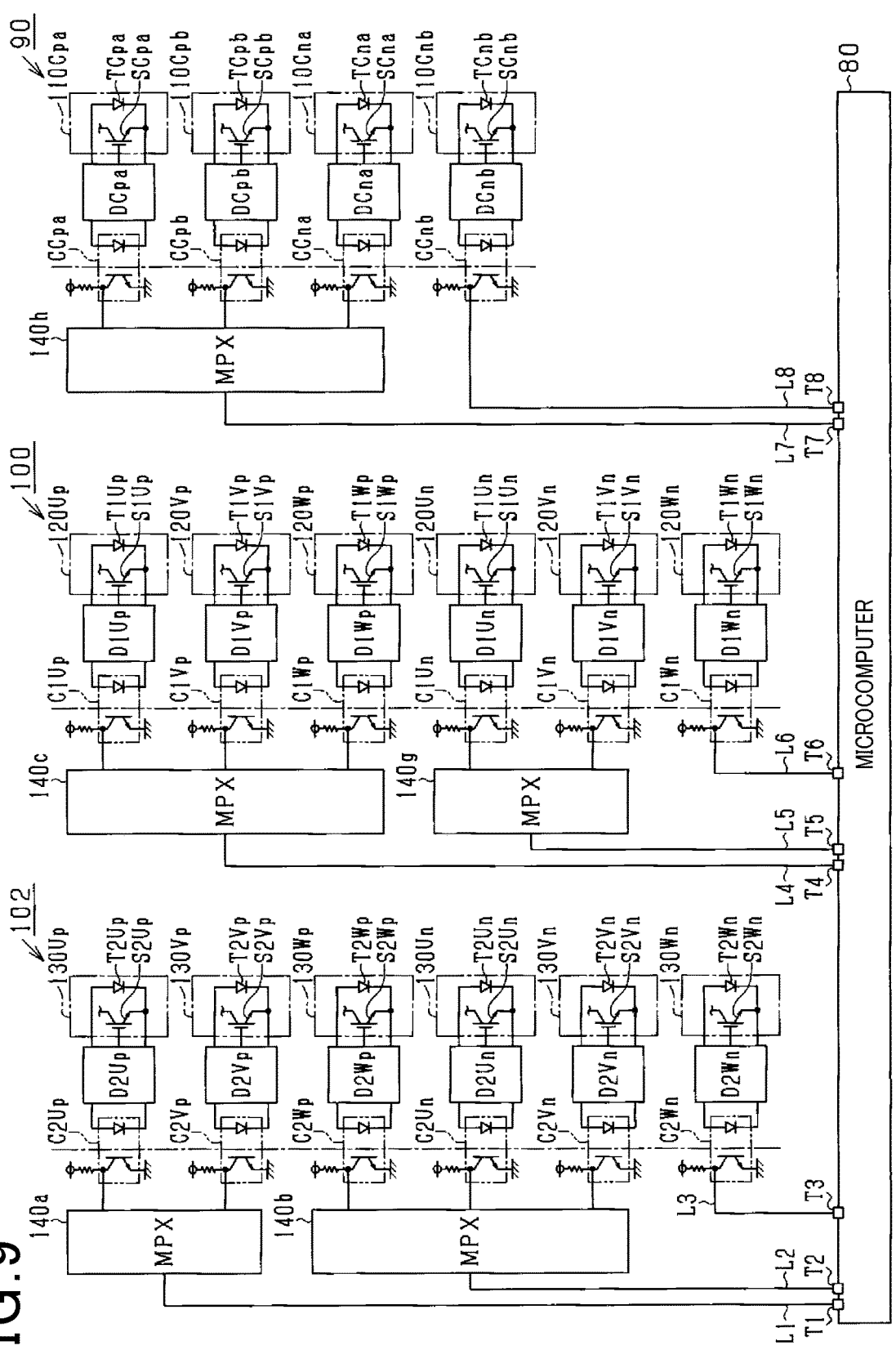
FIG. 9 is a schematic circuit diagram for transferring temperature signals in accordance with a fourth embodiment of the present invention.

There will now be explained a fourth embodiment of the present invention. Only differences of the fourth embodiment from the third embodiment will be explained with reference to the accompanying drawings. In the present embodiment, as shown in FIG. 9, for each of the buck-boost converter 90, the first inverter 100, and the second inverter 102, one temperature signal is input directly to the microcomputer 80 without passing through any multiplexer. In FIG. 9, members same as the members shown in FIG. 8 are assigned the same numbers.

As shown in FIG. 9, outputs of the respective U-, V-phase lower-arm photocouplers C1Un, C1Vn for the first inverter 100 are electrically connected to a fifth input port T5 of the microcomputer 80 via a fourth multiplexer 140g and a fifth electrical path L5. The output of the W-phase lower-arm photocoupler C1Wn is electrically connected directly to a sixth input port T6 of the microcomputer 80 via a sixth electrical path L6 without any multiplexer. This is because, in the present embodiment, the W-phase lower-arm switching element S1Wn may be assumed to be hottest among the switching elements forming the first inverter 100 during use.

Outputs of the respective voltage-transformation photocouplers CCpa, CCpb, CCna are electrically connected to a seventh input port T7 of the microcomputer 80 via a fifth multiplexer 140h and a seventh electrical path L7. In addition, the output of the lower-arm voltage-transformation photocoupler CCnb is are electrically connected to an eighth input port T8 of the microcomputer 80 via an eighth electrical path L8 without any multiplexer. This is because, in the present embodiment, the lower-arm voltage-transformation switching element SCnb may be assumed to be hottest among the switching elements forming the buck-boost converter 90 during use.

Advantages of the present embodiment will now be explained. The operational aspect or the value of flowing current may be different between the buck-boost converter 90, the first inverter 100, and the second inverter 102. Thus, heat generation amounts of the respective switching elements may be different between the buck-boost converter 90, the first inverter 100, and the second inverter 102, which leads to different temperatures of the respective switching elements between the buck-boost converter 90, the first inverter 100, and the second inverter 102. In the present embodiment, for each of the buck-boost converter 90, the first inverter 100, and the second inverter 102, one temperature signal is input directly to the microcomputer 80 without passing through any multiplexer. This can enhance the accuracy of detecting the temperatures of the whole switching elements.

Fifth Embodiment

Figure 10:
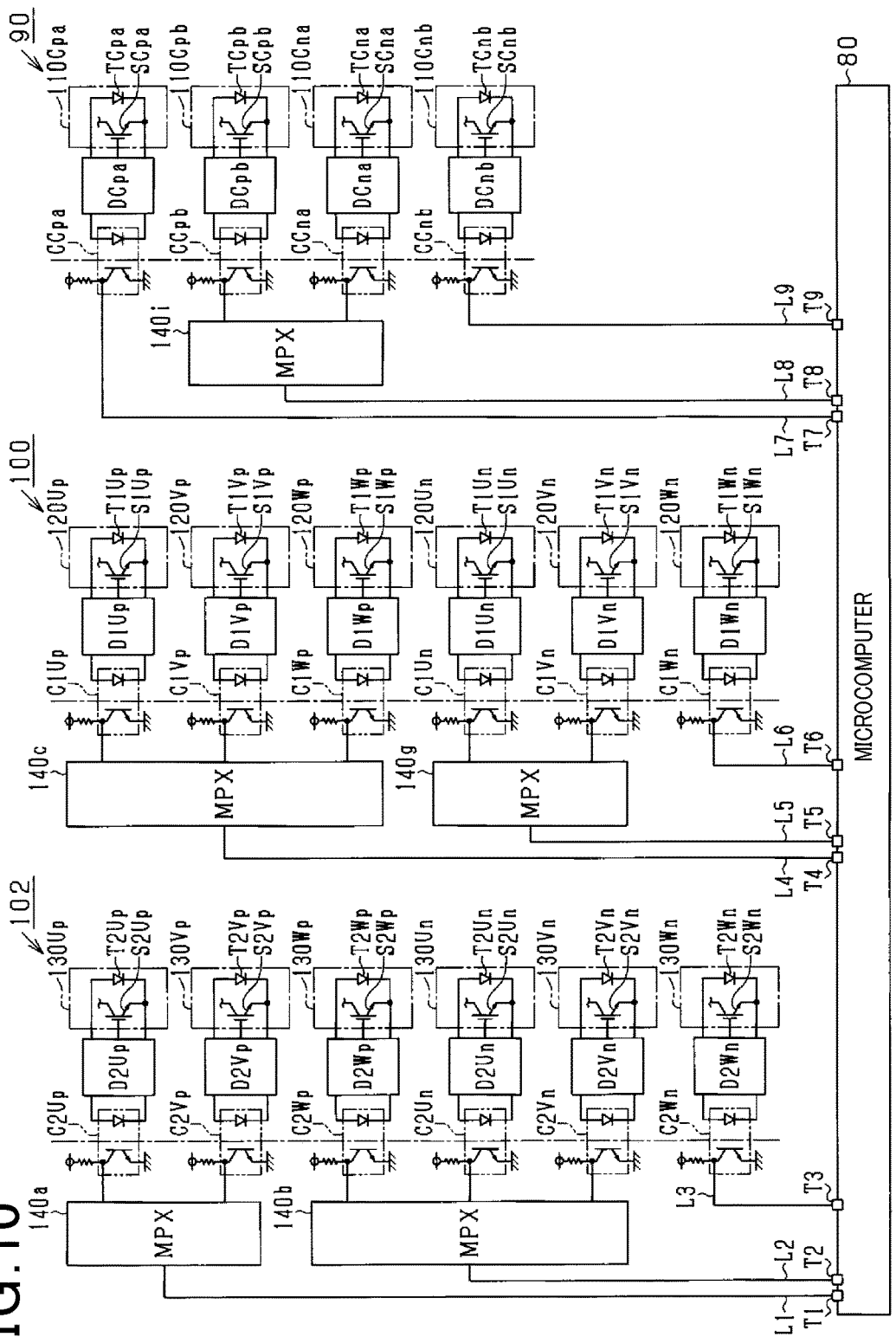
FIG. 10 is a schematic circuit diagram for transferring temperature signals in accordance with a fifth embodiment of the present invention.

There will now be explained a fifth embodiment of the present invention. Only differences of the fifth embodiment from the fourth embodiment will be explained with reference to the accompanying drawings. In the present embodiment, as shown in FIG. 10, for the buck-boost converter 90, the temperature signal of one of the upper-arm switching elements and the temperature signal of one of the lower-arm switching elements are input directly to the microcomputer 80 without passing through any multiplexer. In FIG. 10, members same as the members shown in FIG. 9 are assigned the same numbers.

As shown in 10, the output of the upper-arm voltage-transformation photocoupler CCpa is electrically connected to the seventh input port T7 of the microcomputer 80 via the seventh electrical path L7 without any multiplexer. This is because, in the present embodiment, the switching element SCpa may be assumed to be hottest among the upper-arm voltage-transformation switching elements SCpa, SCpb during use. The outputs of the respective voltage-transformation photocouplers CCpb, CCna are electrically connected to the eighth input port T8 of the microcomputer 80 via a fifth multiplexer 140i and the eighth electrical path L8. The output of the lower-arm voltage-transformation photocoupler CCnb is electrically connected to a ninth input port T9 of the microcomputer 80 via a ninth electrical path L9 without any multiplexer. This is because, in the present embodiment, the switching element SCpb may be assumed to be hottest among the lower-arm voltage-transformation switching elements SCna, SCnb during use.

Advantages of the present embodiment will now be explained. In the buck-boost converter 90, the switching elements that are turned on and off during the voltage step-up operation are different from the switching elements that are turned on and off during the voltage step-down operation. Therefore, during the voltage step-up operation, the temperatures of the respective lower-arm voltage-transformation switching elements SCna, SCnb are higher than the temperatures of the respective upper-arm voltage-transformation switching elements SCpa, SCpb. During the voltage step-down operation, the temperatures of the respective upper-arm voltage-transformation switching elements SCpa, SCpb are higher than the temperatures of the respective lower-arm voltage-transformation a switching elements SCna, SCnb. Therefore, in the present embodiment, the temperature signal of one of the upper-arm switching elements and the temperature signal of one of the lower-arm switching elements are input directly to the microcomputer 80 without passing through any multiplexer. This can enhance the accuracy of detecting the temperatures of the whole switching elements.

Sixth Embodiment

Figure 11:
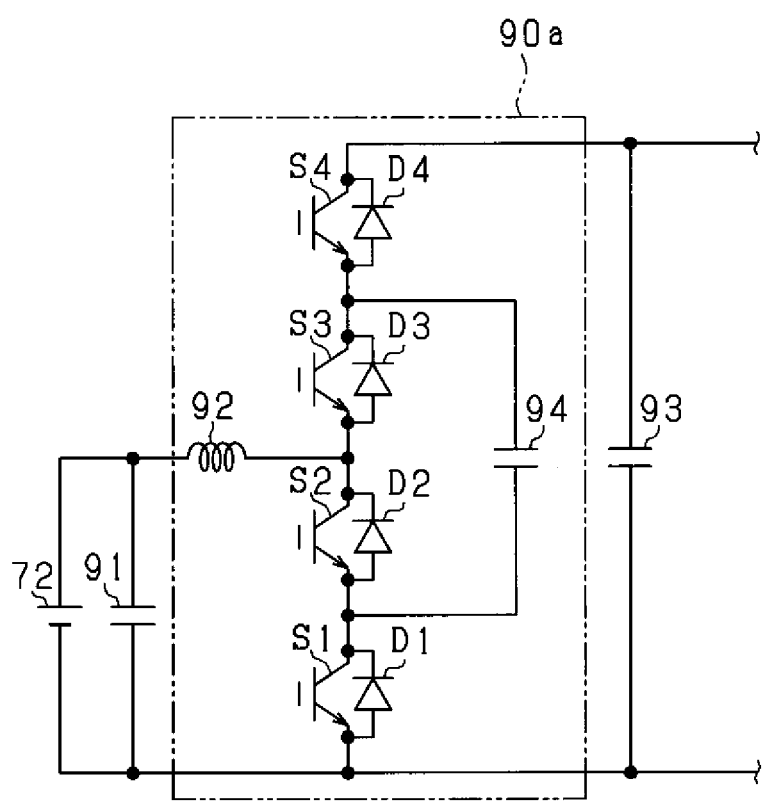
FIG. 11 is a schematic diagram of a buck-boost converter in accordance with a sixth embodiment of the present invention.

There will now be explained a sixth embodiment of the present invention. Only differences of the sixth embodiment from the third to fifth embodiments will be explained with reference to the accompanying drawings. In the present embodiment, as shown in FIG. 11, the buck-boost converter 90a is modified in configuration. In FIG. 11, members same as the members shown in FIG. 7 are assigned the same numbers.

In the present embodiment, as shown in FIG. 11, the buck-boost converter 90a includes a lower-arm series connection of first and second switching elements S1, S2 and an upper-arm series connection of third and fourth switching elements S3, S4. In the present embodiment, an IGBT is used for each of the switching elements S1, S2, S3, S4. The switching elements S1, S2, S3, S4 are electrically connected in anti-parallel with respective freewheel diodes D1, D2, D3, D4.

A junction between the second switching element S2 and the third switching element S3 is electrically connected to the first end of the reactor 92. A junction between the first switching element S1 and the second switching element S2 is electrically connected to a junction between the third switching element S3 and the fourth switching element S4 through an auxiliary capacitor 94. The emitter of the first switching element S1 is the negative terminal of the high-voltage battery 72.

The voltage step-up operation and the voltage step-down operation of the buck-boost converter 90a will now be explained. In the present embodiment, the voltage step-up operation is implemented by combinations of first to fourth modes. In the first mode, the first and second switching elements S1, S2 are turned on, and the third and fourth switching elements S3, S4 are turned off. In the second mode, the first and third switching elements S1, S3 are turned on, and the second and fourth switching elements S2, S4 are turned off. In the third mode, the second and fourth switching elements S2, S4 are turned on, and the first and third switching elements S1, S3 are turned off. In the fourth mode, the third and fourth switching elements S3, S4 are turned on, and the first and second switching elements S1, S2 are turned off. The voltage step-up operation may be implemented by a cyclic sequence of modes, for example, the first mode→the second mode→the first mode→the third mode or the second mode→the fourth mode→the third mode→the fourth mode.

In the present embodiment, the voltage step-up operation is implemented by combinations of fifth to eighth modes. In the fifth mode, the first to fourth switching elements S1-S4 are all turned off. In the sixth mode, the third switching element S3 is turned on, and the first, second and fourth switching elements S1, S2, S4 are turned off. In the seventh mode, the fourth switching element S4 is turned on, and the first to third switching elements S1-S3 are turned off. In the eighth mode, the third and fourth switching elements S3, S4 are turned on, and the first and second switching elements S1, S2 are turned off. The voltage step-down operation may be implemented by a cyclic sequence of modes, for example, the fifth mode→the sixth mode→the fifth mode→the seventh mode or the eighth mode→the sixth mode→the eighth mode→the seventh mode.

As described above, as in the third to fifth embodiments, during the voltage step-up operation, only the first and second lower-arm switching elements S1, S2 are turned on and off. During the voltage step-down operation, only the third and fourth upper-arm switching elements S3, S4 are turned on and off. Therefore, as in the third to fifth embodiments shown in FIGS. 8-10, a similar configuration for detecting temperatures of the switching elements forming the buck-boost converter 90a is applicable in the present embodiment. More specifically, in the present embodiment, for example, the lower-arm voltage-transformation switching elements SCna, SCnb in each of the third to fifth embodiments may be replaced with the first and second switching elements S1, S2, and the upper-arm voltage-transformation switching elements SCpa, SCpb may be replaced with the third and fourth switching elements S3, S4.

Seventh Embodiment

Figure 12:
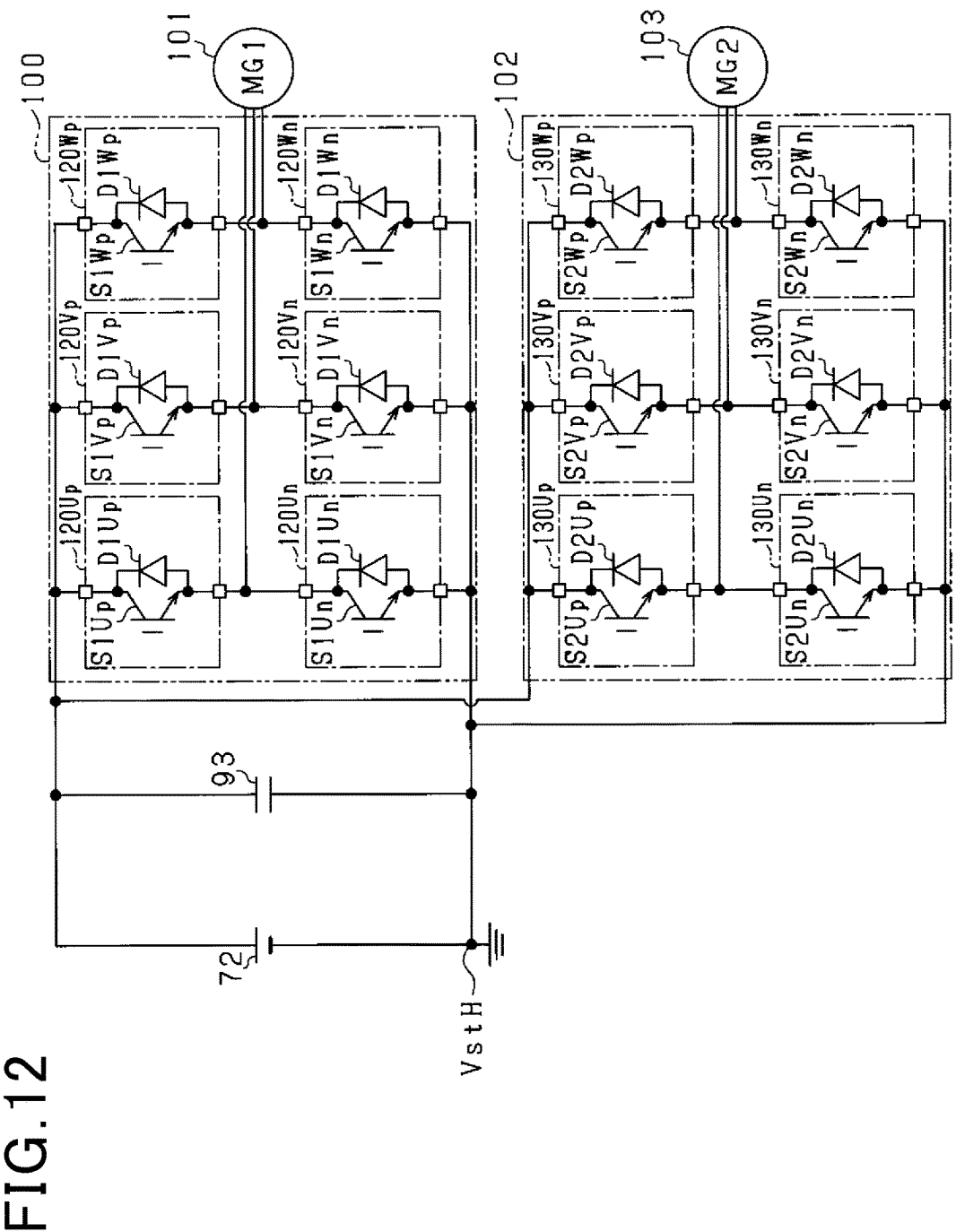
FIG. 12 is a schematic diagram of a motor control system in accordance with a seventh embodiment of the present invention.

There will now be explained a seventh embodiment of the present invention. Only differences of the seventh embodiment from the third embodiment will be explained with reference to the accompanying drawings. In the present embodiment, as shown in FIG. 12, the buck-boost converter 90 is absent in the motor control system. In FIG. 12, members same as the members shown in FIG. 7 are assigned the same numbers.

The present embodiment can thus provide similar advantages to those of the third embodiment.

Eighth Embodiment

Figure 13:
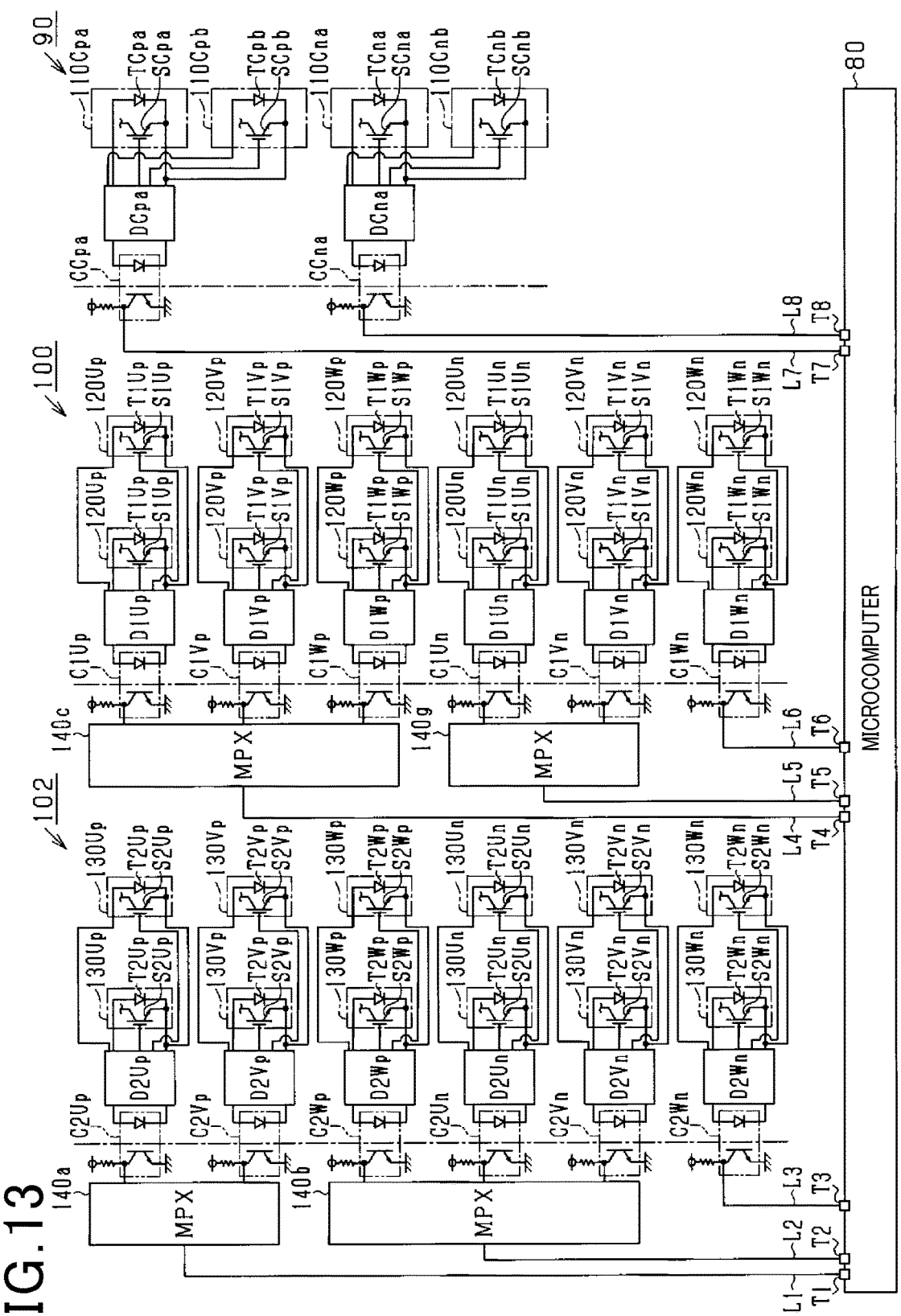
FIG. 13 is a schematic circuit diagram for transferring temperature signals in accordance with an eighth embodiment.

There will now be explained an eighth embodiment of the present invention. Only differences of the eighth embodiment from the fifth embodiment will be explained with reference to the accompanying drawings. In the present embodiment, as in the buck-boost converter 90, each of the first inverter 100 and the second inverter 102 includes upper-arm parallel connections (for the respective phases) of two switching elements and lower-arm parallel connections (for the respective phases) of two switching elements. Accordingly, as shown in FIG. 13, in each of the first inverter 100 and the second inverter 102, each pair of two switching elements connected in parallel with each other are turned on and off by their shared drive circuit. Each drive circuit is configured to receive temperature signals from the temperature-sensitive diodes respectively associated with the two switching elements connected in parallel with each other, and output a time-multiplexed signal for the received temperature signals to the photocoupler. This is because the temperatures of the respective two switching elements connected in parallel with each other may be different from each other. In FIG. 13, for each of the first inverter 100 and the second inverter 102, each pair of semiconductor modules including the respective two switching elements connected in parallel with each other are assigned the same numbers.

As shown in FIG. 13, the temperature signals outputted from the temperature-sensitive diodes TCpa, TCpb associated with the upper-arm switching elements are input to the shaped drive circuit DCpa. The drive circuit DCpa is configured to output the time-multiplexed signal to the input of the upper-arm voltage-transformation photocoupler CCpa. The output of the upper-arm voltage-transformation photocoupler CCpa is connected directly to a seventh input port T7 of the microcomputer 80 via a seventh electrical path L7 without any multiplexer. The temperature signals outputted from the temperature-sensitive diodes TCna, TCnb associated with the lower-arm switching elements are input to the shaped drive circuit DCna. The drive circuit DCna is configured to output the time-multiplexed signal to the input of the lower-arm voltage-transformation photocoupler CCna. The output of the lower-arm voltage-transformation photocoupler CCna is connected directly to an eighth input port T8 of the microcomputer 80 via an eighth electrical path L8 without any multiplexer. In the present embodiment, the control system does not include any multiplexer associated with the buck-boost converter 90. The temperature detection configuration for each of the first inverter 100 and the second inverter 102 based on the time multiplexing is similar to that of the buck-boost converter 90.

Figure 14:
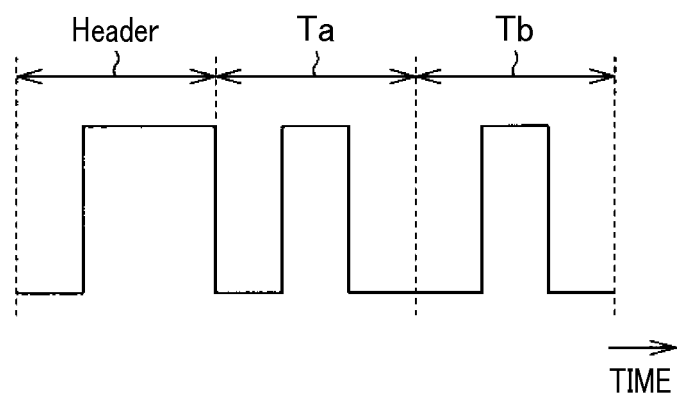
FIG. 14 is an example of time-multiplexed frame signal in accordance with the eighth embodiment.

The time multiplexing performed by each drive circuit will now be explained with reference to FIG. 14. In time multiplexing, the drive circuit generates and outputs a frame signal including a header, a first temperature signal Ta, and a second temperature signal Tb, in this order. In the present embodiment, the temperature signals Ta, Tb are duty signals correlated to the temperatures. More specifically, as an example, the upper-arm drive circuit DCpa of the buck-boost converter 90 operates as follows. The first temperature signal Ta is a temperature signal of the switching element SCpa based on the output signal of the temperature-sensitive diode TCpa, and the second temperature signal Tb is a temperature signal of the switching element SCpb based on the output signal of the temperature-sensitive diode TCpb. Upon receipt of the time-multiplexed frame signal, the microcomputer 80 calculates temperatures of the respective two switching elements based on the received frame signal.

In the present embodiment, even though the upper-arm switching elements are electrically connected in parallel with each other and the lower-arm switching elements are electrically connected in parallel with each other, the temperature detection accuracy can be enhanced while suppressing the number of components.

Other Embodiments

There will now be explained modifications to the respective above embodiments.

In the first embodiment, there are the plurality of multiplexers. Alternatively, the number of multiplexers may be one.

Power converters other than the three-phase inverter are applicable to the present invention. Electronic devices having switching elements, other than power converters, may also be applicable. The number of switching elements in each of such power converters or electronic devices is not limited to six, and may be equal to or greater than three, but not six. For each of such power converters or electronic devices, at least three switching elements allow at least one temperature signal to be input directly to the microcomputer without any multiplexer and allows at least two temperature signals to be input to the microcomputer via the multiplexer.

More specifically, such a system as above may include, for example, the two-motor control system having two motor generators. Since such a system includes two three-phase inverters as power converters or electronic devices, the number of switching elements is equal to or greater than twelve, where the number of multiplexers is not limited to two, and may be equal to or greater than three. For example, when the number of switching elements is twelve and the number of multiplexers is three, first to three multiplexers may have three, four, and four input ports, respectively. Even though a difference in number of input ports between these multiplexers is up to one, variations in the lag time of transfer of the temperature signal from the temperature-sensitive diode to the microcomputer via the multiplexer can be minimized. This can thus minimize the time intervals between detection of temperatures of a specific switching element.

In the first embodiment, only one temperature signal may be input directly to the microcomputer without any multiplexer, where, as an example, the first multiplexer may have three input ports.

Some specifications of the three-phase inverter 10 may cause the W-phase lower-arm semiconductor module 50Wn that is most far away from the upstream portion of the inlet line 30a and adjacent the pressing member 60 to be hottest during use.

In the first embodiment, for each of the multiplexers, when the number of output ports is less than the number of input ports, the multiplexer may have two or more output ports.

Each switching element is not limited to the single IGBT, and may be a parallel connection of plural IGBTs. More specifically, collector terminals of the plural IGBTs are electrically connected to each other, and emitter terminals of the plural IGBTs are electrically connected to each other. In such a configuration, the actual temperature variation as shown in FIG. 5 will be increased due to a "parallel-connection variation" that is a variation in temperature during use between the plural IGBTs caused by a variation in flowing collector current between the plural IGBTs. The parallel-connection variation exists in each of the detection element and the non-detection element shown in FIG. 5. Thus, the actual temperature variation may be doubled as compared with the actual temperature variation of FIG. 5. Accordingly, the threshold temperature Tγ needs to be set lower for safety. A temperature range where use is restricted is thus prone to be enlarged. Therefore, in such a configuration, it is more advantageous to detect temperatures of the respective whole switching elements.

The six switching elements are individually modularized as the six semiconductor modules. Alternatively, for example, the six switching elements are connected in series with each other, and lower-arm switching elements may be modularized as a single semiconductor module.

Each insulating transfer element for transferring a signal from the high voltage domain to the low voltage domain while electrically isolating the high and low voltage domains from each other is not limited to the optical insulating transfer element. Alternatively, the insulating transfer element may be a magnetic insulating transfer element, such as a pulse transformer.

Instead of the IGBT, for example, a metal-oxide semiconductor field-effect transistor (MOSFET) may be used as each of the switching elements that produce heat when energized.

Each temperature signal output for outputting the temperature signal correlated to the temperature of one of the switching elements is not limited to the temperature-sensitive diode. Alternatively, each temperature signal output for outputting the temperature signal correlated to the temperature of one of the switching elements may be a thermistor. A copper pattern is formed on a first side (e.g., a top surface) of an insulated substrate, and a heat sink is mounted on a second side (e.g., a bottom surface) of the substrate. The switching element and the freewheel diode are mounted on the substrate by soldering or the like, thereby forming a module. The switching element and the freewheel diode are electrically connected via the pattern, and the thermistor may be mounted on the pattern of the module. Heat produced in the switching element or the freewheel diode dissipated to the thermistor via the pattern. Therefore, the temperature of at least one of the switching element and the freewheel diode can be detected.

Each power-conversion semiconductor element that produces heat when energized is not limited to the IGBT. Alternatively, each power-conversion semiconductor element that produces heat when energized may include a MOSFET or an RC-IGBT. The RC-IGBT is a diode-embedded IGBT such that the IGBT and the freewheel diode are mounted on the same chip. In addition, each power-conversion semiconductor element that produces heat when energized is not limited to the switching element as a power semiconductor. Alternatively, the power-conversion semiconductor elements that produce heat when energized may include the freewheel diode. For example, in the buck-boost converter, a large amount of heat may be generated in the upper-arm freewheel diode during voltage step-up operation. Therefore, it is advantageous to detect a temperature of the freewheel diode.

In each of the third to sixth, and eighth embodiments, the buck-boost converter is used. Alternatively, either a boost converter or a buck converter may be used.

In the third embodiment, for example, one of the switching elements forming the buck-boost converter 90 or the first inverter 100 may be hottest among the whole switching elements forming the buck-boost converter 90, the first inverter 100, and the second an inverter 102. For example, when one of the switching elements forming the buck-boost converter 90 is hottest during use, only the switching elements forming the buck-boost converter 90 may be connected directly to the microcomputer 80 without any multiplexer.

In each of the third to seventh embodiments, for each of the buck-boost converter 90, the first inverter 100, and the second inverter 102, at least one multiplexer may have four or more input ports. For example, each of the buck-boost converter 90, the first inverter 100, and the second inverter 102 may each have a single multiplexer. In the third embodiment, for example, a single multiplexer for the second inverter 102 may have five input ports, a single multiplexer for the first inverter 100 may have six input ports, and a single multiplexer for the buck-boost converter 90 may have four input ports.

In each of the third to seventh embodiments, the multiplexers may each receive temperature signals from at least two of the buck-boost converter 90, the first inverter 100 and the second inverter 102. In the eighth embodiment, the multiplexers may each receive temperature signals from both the first inverter 100 and the second inverter 102.

In each of the third to eighth embodiments, the number of motor generators may be greater than two.

In the third embodiment, the high-voltage battery 72 may be replaced with a low-voltage battery having a lower output voltage (e.g., 12V) than the high-voltage battery 72. Such a configuration may be applied to a system where, for example, an engine is only one vehicle prime mover and the motor generator is used as an integrated starter generator (ISG) that integrates starter and alternator functionalities.

In the seventh embodiment, the high-voltage battery 72 electrically connected to the first inverter 100 may be replaced with a low-voltage battery having a lower output voltage (e.g., 12V) than the high-voltage battery 72. Such a configuration may be applied to a system where, for example, an engine and a motor are mounted in the vehicle as vehicle prime movers and the first motor generator 101 is used as an integrated starter generator (ISG) that integrates starter and alternator functionalities.

In the eighth embodiment, the motor control system may not have the buck-boost converter 90. In addition, in the eighth embodiment, the motor control system may include a single motor generator.

In each of the third to seventh embodiments, the buck-boost converter 90 may be formed by parallel connections of three or more switching elements, and each of the first and second inverters 100, 102 may be formed by parallel connections of two or more switching elements. In the eighth embodiment, each of the buck-boost converter 90, the first inverter 100, and the second inverter 102 may be formed by parallel connections of three or more switching elements, and each of the first and second inverters 100, 102 may be formed by parallel connections of three or more switching elements. Further, at least one of the first inverter 100, the second inverter 102, and the buck-boost converter 90 may be formed by parallel connections of plural switching elements.

In the eighth embodiment, each drive circuit may not perform any time multiplexing process. In such a case, each temperature-sensitive diode individually includes the drive circuit and the photocoupler.

In the eighth embodiment, the number of input ports for each of the multiplexers respectively corresponding to the first inverter 100 and the second inverter 102 may be equal to or greater than four. More specifically, the number of input ports for the multiplexer corresponding to the second an inverter 102 may be five, and the number of input ports for the multiplexer corresponding to the first an inverter 100 may be five. This allows the number of multiplexers for each of the first inverter 100 and the second inverter 102 to be one. Given a multiplexer having ten input ports, the first inverter 100 and the second inverter 102 may share such a multiplexer, which allows the number of multiplexers for the first inverter 100 and the second inverter 102 to be one.

In each of the third to eighth embodiments, the outputs of the respective whole photocouplers electrically connected to the respective drive circuits may be connected directly to the input ports of the microcomputer 80 without any multiplexer.

In each of the first and second embodiments, the inverter may be formed by parallel connections of plural switching elements, where for each parallel connection of plural switching elements, the temperature for the parallel connection of plural switching elements may be transferred from a drive circuit shared by the plural switching elements to the microcomputer via the photocoupler by using the time multiplexing process.

What is claimed is:

1. An apparatus for detecting temperatures of power-conversion semiconductor elements, the apparatus being applicable to a system including a plurality of power-conversion semiconductor elements that produce heat when energized, a plurality of temperature signal outputs associated with the respective power-conversion semiconductor elements, the temperature signal outputs being configured to output temperature signals correlated to temperatures of the respective power-conversion semiconductor elements, the apparatus comprising:
    a microcomputer configured to detect the temperatures of the respective power-conversion semiconductor elements based on the temperature signals outputted from the respective temperature signal outputs, and
    at least one input-output interface having a plurality of input ports and an output port selectively connected to one of the plurality of input ports,
    wherein the temperature signal outputted from at least one of the plurality of temperature signal outputs is input directly to the microcomputer without passing through the at least one input-output interface,
    the temperature signals outputted from the other two or more temperature signal outputs are input to the respective input ports of the at least one input-output interface,
    the microcomputer is configured to detect the temperatures of the respective power-conversion semiconductor elements based on the temperature signals received from the output port of the at least one input-output interface and the temperature signal received directly from the at least one of the plurality of temperature signal outputs.

2. The apparatus of claim 1, wherein the at least one of the plurality of temperature signal outputs that outputs the temperature signal to be input directly to the microcomputer without passing through the at least one input-output interface is associated with the power-conversion semiconductor element assumed to be hottest among the plurality of power-conversion semiconductor elements during use of the system.

3. The apparatus of claim 1, wherein the microcomputer is configured to, when determining that one of the temperatures of the respective power-conversion semiconductor elements exceeds a threshold temperature, de-energize the power-conversion semiconductor elements or reduce power supplied to the power-conversion semiconductor elements.

4. The apparatus of claim 1, wherein the system comprising:
    an inverter configured to apply an alternating voltage to a rotating electric machine, the inverter including plural pairs of upper-arm and lower-arm power-conversion semiconductor elements, the plurality of temperature signal outputs associated with the respective power-conversion semiconductor elements forming the inverter being referred to as inverter outputs; and
    a voltage-transformation converter including plural pairs of upper-arm and lower-arm power-conversion semiconductor elements, the voltage-transformation converter being configured to transmit power to and/or receive power from the inverter with voltage transformation, the plurality of temperature signal outputs associated with the respective power-conversion semiconductor elements forming the voltage-transformation converter being referred to as converter outputs,
    wherein the temperature signal outputted from at least one of the plurality of the inverter outputs and the temperature signal outputted from at least one of the plurality of the converter outputs are input directly to the microcomputer without passing through the at least one input-output interface, and
    the temperature signals outputted from the other two or more inverter outputs and the temperature signals outputted from the other two or more converter outputs are input to the respective input ports of the at least one input-output interface.

5. The apparatus of claim 4, wherein the power-conversion semiconductor elements forming the inverter and the power-conversion semiconductor elements forming the voltage-transformation converter include switching elements, one for each power-conversion semiconductor element,
    the voltage-transformation converter is a buck-boost converter configured to step up a voltage received from a direct-current (DC) power source to apply the stepped-up voltage to the inverter during voltage step-up operation, and step down a direct voltage received from the inverter to apply the stepped-down voltage to the DC power source during voltage step-down operation,
    the lower-arm switching elements of the voltage-transformation converter are turned on and off during the voltage step-up operation of the voltage-transformation converter, and the upper-arm switching elements of the voltage-transformation converter are turned on and off during the voltage step-down operation of the voltage-transformation converter,
    the temperature signal outputs associated with the respective upper-arm power-conversion semiconductor elements of the voltage-transformation converter are referred to as upper-arm converter outputs,
    the temperature signal outputs associated with the respective lower-arm power-conversion semiconductor elements of the voltage-transformation converter are referred to as lower-arm converter outputs, and the temperature signal outputted from at least one of the upper-arm converter outputs and the temperature signal outputted from at least one of the lower-arm converter outputs are input directly to the microcomputer without passing through the at least one input-output interface.

6. The apparatus of claim 1, wherein the system comprising:
at least one inverter configured to apply an alternating voltage to a least one rotating electric machine, the at least one inverter includes plural pairs of upper-arm and lower-arm power-conversion semiconductor elements, the plurality of temperature signal outputs associated with the respective power-conversion semiconductor elements forming the inverter being referred to as inverter outputs; and
a voltage-transformation converter including plural pairs of upper-arm and lower-arm power-conversion semiconductor elements, the voltage-transformation converter being configured to transmit power to and/or receive power from the at least one inverter with voltage transformation, the plurality of temperature signal outputs associated with the respective power-conversion semiconductor elements forming the voltage-transformation converter being referred to as converter outputs,
wherein the least one rotating electric machine comprises a plurality of rotating electric machines,
the at least one inverter comprises a plurality of inverters, one for each rotating electric machine, each of the plurality of inverters being configured to apply the alternating voltage to a respective one of the plurality of rotating electric machines,
none of the temperature signals outputted from the respective converter outputs are input to any one of the at least one input-output interface that receives at least one of the temperature signals outputted from the inverter outputs, and
none of the temperature signals outputted from the respective inverter outputs are input to any one of the at least one input-output interface that receives at least one of the temperature signals outputted from the converter outputs.

7. The apparatus of claim 6, wherein the power-conversion semiconductor elements forming the inverter and the power-conversion semiconductor elements forming the voltage-transformation converter include switching elements, one for each power-conversion semiconductor element,
the voltage transformation converter is a buck-boost converter configured to step up a voltage received from a direct-current (DC) power source to apply the stepped-up voltage to the inverter during voltage step-up operation, and step down a direct voltage received from the inverter to apply the stepped-down voltage to the DC power source during voltage step-down operation,
the lower-arm switching elements of the voltage-transformation converter are turned on and off during the voltage step-up operation of the voltage-transformation converter, and the upper-arm switching elements of the voltage-transformation converter are turned on and off during the voltage step-down operation of the voltage-transformation converter,
the temperature signal outputs associated with the respective upper-arm power-conversion semiconductor elements of the voltage-transformation converter are referred to as upper-arm converter outputs,
the temperature signal outputs associated with the respective lower-arm power-conversion semiconductor elements of the voltage-transformation converter are referred to as lower-arm converter outputs,
none of the temperature signals outputted from the respective upper-arm converter outputs are input to any one of the at least one input-output interface that receives at least one of the temperature signals outputted from the lower-arm converter outputs and the inverter outputs, and
none of the temperature signals outputted from the respective lower-arm converter outputs are input to any one of the at least one input-output interface that receives at least one of the temperature signals outputted from the upper-arm converter outputs and the inverter outputs.

8. The apparatus of claim 1, wherein the system comprising:
an inverter configured to apply an alternating voltage to a rotating electric machine, the inverter including plural pairs of upper-arm and lower-arm power-conversion semiconductor elements, and
a voltage-transformation converter including plural pairs of upper-arm and lower-arm power-conversion semiconductor elements, the voltage-transformation converter being configured to transmit power to and/or receive power from the inverter with voltage transformation,
at least one of the power-conversion semiconductor elements forming at least one of the inverter and the voltage-transformation converter includes at least one parallel connection of switching elements,
the voltage-transformation converter is a buck-boost converter configured to step up a voltage received from a direct-current (DC) power source to apply the stepped-up voltage to the inverter during voltage step-up operation, and step down a direct voltage received from the inverter to apply the stepped-down voltage to the DC power source during voltage step-down operation,
the lower-arm switching elements of the voltage-transformation converter are turned on and off during the voltage step-up operation of the voltage-transformation converter, and the upper-arm switching elements of the voltage-transformation converter are turned on and off during the voltage step-down operation of the voltage-transformation converter, and
the temperature signals outputted from the temperature signal output associated with the at least one parallel connection of switching elements are time-multiplexed and input to the microcomputer.

9. The apparatus of claim 8, wherein the plurality of temperature signal outputs associated with the respective power-conversion semiconductor elements forming the inverter are grouped into a plurality of parallel connections of power-conversion semiconductor elements, the plurality of parallel connections of power-conversion semiconductor elements being referred to as groups of inverter outputs,
the plurality of temperature signal outputs associated with the respective upper-arm power-conversion semiconductor elements of the voltage-transformation converter are grouped into a plurality of parallel connections of upper-arm power-conversion semiconductor elements, the plurality of parallel connections of upper-arm power-conversion semiconductor elements being referred to as groups of upper-arm converter outputs,
the plurality of temperature signal outputs associated with the respective lower-arm power-conversion semiconductor elements of the voltage-transformation converter are grouped into a plurality of parallel connections of lower-arm power-conversion semiconductor elements, the plurality of parallel connections of lower-arm power-conversion semiconductor elements being referred to as groups of lower-arm converter outputs, the temperature signals outputted from at least one of the plurality of groups of inverter outputs are time-multiplexed and input directly to the microcomputer without passing through the at least one input-output interface, and the temperature signals outputted from the other two or more groups of inverter outputs are time-multiplexed and then input to the respective input ports of the at least one input-output interface, the temperature signals outputted from the plurality of groups of upper-arm converter outputs are time-multiplexed and input directly to the microcomputer without passing through the at least one input-output interface, and the temperature signals outputted from the plurality of groups of lower-arm converter outputs are time-multiplexed and input directly to the microcomputer without passing through the at least one input-output interface.

10. The apparatus of claim 1, wherein the at least one input-output interface comprises a plurality of input-output interfaces, the output port of each of the plurality of input-output interfaces is connected to sequentially selected one of the plurality of input ports of the input-output interface, the temperature signals outputted from the other two or more temperature signal outputs are input to the respective input ports of a respective one of the plurality of input-output interfaces, and the plurality of input-output interfaces are configured such that a difference in number of input ports between the plurality of input-output interfaces is equal to or less than one.

11. The apparatus of claim 10, wherein a number of output ports of each of the plurality of input-output interfaces is one, and a number of input ports of each of the plurality of input-output interfaces is two.

12. The apparatus of claim 1, wherein the plurality of power-conversion semiconductor elements comprise three or more series connections of upper-arm and lower-arm switching elements forming a three-phase inverter, and the microcomputer has six or more input ports and are configured to detect temperatures of the respective six or more switching elements forming the three-phase inverter based on the temperature signals received at the respective six or more input ports.

13. The apparatus of claim 12, wherein at least one of the power-conversion semiconductor elements includes a parallel connection of switching elements, the temperature signals outputted from the temperature signal output associated with the parallel connection of switching elements are time-multiplexed and input to the input port of the microcomputer, and the microcomputer has six input ports and are configured to detect temperatures of the respective switching elements based on the temperature signals received at the respective six input ports.

* * * * *